United States Patent [19]
Watanabe et al.

[11] Patent Number: 5,590,306
[45] Date of Patent: Dec. 31, 1996

[54] MEMORY CARD MANAGEMENT SYSTEM FOR WRITING DATA WITH USAGE AND RECORDING CODES MADE SIGNIFICANT

[75] Inventors: Mikio Watanabe; Akira Aoki; Osamu Saito, all of Asaka, Japan

[73] Assignee: Fuji Photo Film Co., Ltd., Kanagawa, Japan

[21] Appl. No.: 93,640

[22] Filed: Jul. 20, 1993

[30] Foreign Application Priority Data

Sep. 8, 1992 [JP] Japan .................................. 4-239269
Sep. 14, 1992 [JP] Japan .................................. 4-244766

[51] Int. Cl.⁶ ......................................................... G06F 12/00
[52] U.S. Cl. ..................... 395/442; 395/427; 395/430; 395/481; 395/492; 364/DIG. 1; 386/46; 348/233
[58] Field of Search ......................... 395/427, 430, 395/442, 481, 492

[56] References Cited

U.S. PATENT DOCUMENTS 4,887,234  12/1989  Iijima ................................. 364/900
5,226,145  7/1993  Moronaga et al. ..................... 395/425

FOREIGN PATENT DOCUMENTS 63-286077  11/1988  Japan .
2-193236  7/1990  Japan .

Primary Examiner—Frank J. Asta

[57] ABSTRACT

In an IC memory card control system including an IC memory card and an IC memory card control apparatus to which the IC memory card is detachably mounted to store therein management information as well as data, the management area of the IC memory card is provided with an identification area into which are written an occupation code indicative of recording of the data in the data area and a recording code indicative of an abnormal recording of the data in the data area. The IC memory card control apparatus provides such a control that when writing the data into the data area, prior to data writing, the occupation code and the recording code are written into the identification area in their significant states, and after having completed the data writing the recording code is absolved from the significant state.

15 Claims, 19 Drawing Sheets

Fig. 13A

| D2 | D1 | D0 | |
|---|---|---|---|
| 0 | 0 | 0 | PICTURE INFO. (DEFAULT) |
| 0 | 0 | 1 | VOICE INFO. |
| 0 | 1 | 0 | BANK MANAGEMENT INFO. |
| 0 | 1 | 1 | INFO. SPECIFIC TO VENDOR |
| 1 | 0 | 0 | |
| 1 | 1 | 1 | RESERVED |

Fig. 13B

| D3 | COPIED STATE |
|---|---|
| 0 | NO |
| 1 | YES |

| D4 | COPY PROTECT |
|---|---|
| 0 | OFF |
| 1 | ON |

| D5 | ABNORMALITY DETECTION |
|---|---|
| 0 | OFF |
| 1 | ON |

| D6 | WRITE PROTECT |
|---|---|
| 0 | OFF |
| 1 | ON |

| D7 | OCCUPIED STATE |
|---|---|
| 0 | NO |
| 1 | YES |

Fig. 14A

|  | MSB | | | | | | | LSB | | |
|---|---|---|---|---|---|---|---|---|---|---|
|  | D7 | D6 | D5 | D4 | D3 | D2 | D1 | D0 | | |
| START CLUSTER OF PACKET 12 | 0 | 0 | 0 | 0 | 0 | 0 | 0 | 0 | 00h | 0017h START CLUSTER=23 |
|  | 0 | 0 | 0 | 1 | 0 | 1 | 1 | 1 | 17h | |

| MAT OF CLUSTER 23 | 0 | 0 | 0 | 0 | 0 | 0 | 0 | 0 | 00h | 0018h MAT OF CLUSTER 23=24 |
|---|---|---|---|---|---|---|---|---|---|---|
|  | 0 | 0 | 0 | 1 | 1 | 0 | 0 | 0 | 18h | |

| MAT OF CLUSTER 24 | 0 | 0 | 0 | 0 | 0 | 0 | 0 | 0 | 00h | 001Eh MAT OF CLUSTER 24=30 |
|---|---|---|---|---|---|---|---|---|---|---|
|  | 0 | 0 | 0 | 1 | 1 | 1 | 1 | 0 | 1Eh | |

| MAT OF CLUSTER 30 | 0 | 0 | 0 | 0 | 0 | 0 | 0 | 0 | 00h | 0028h MAT OF CLUSTER 30=40 |
|---|---|---|---|---|---|---|---|---|---|---|
|  | 0 | 0 | 1 | 0 | 1 | 0 | 0 | 0 | 28h | |

| MAT OF CLUSTER 40 | 1 | 1 | 1 | 1 | 1 | 1 | 1 | 1 | FFh | FFFFh CLUSTER CONTINUITY OVER |
|---|---|---|---|---|---|---|---|---|---|---|
|  | 1 | 1 | 1 | 1 | 1 | 1 | 1 | 1 | FFh | |

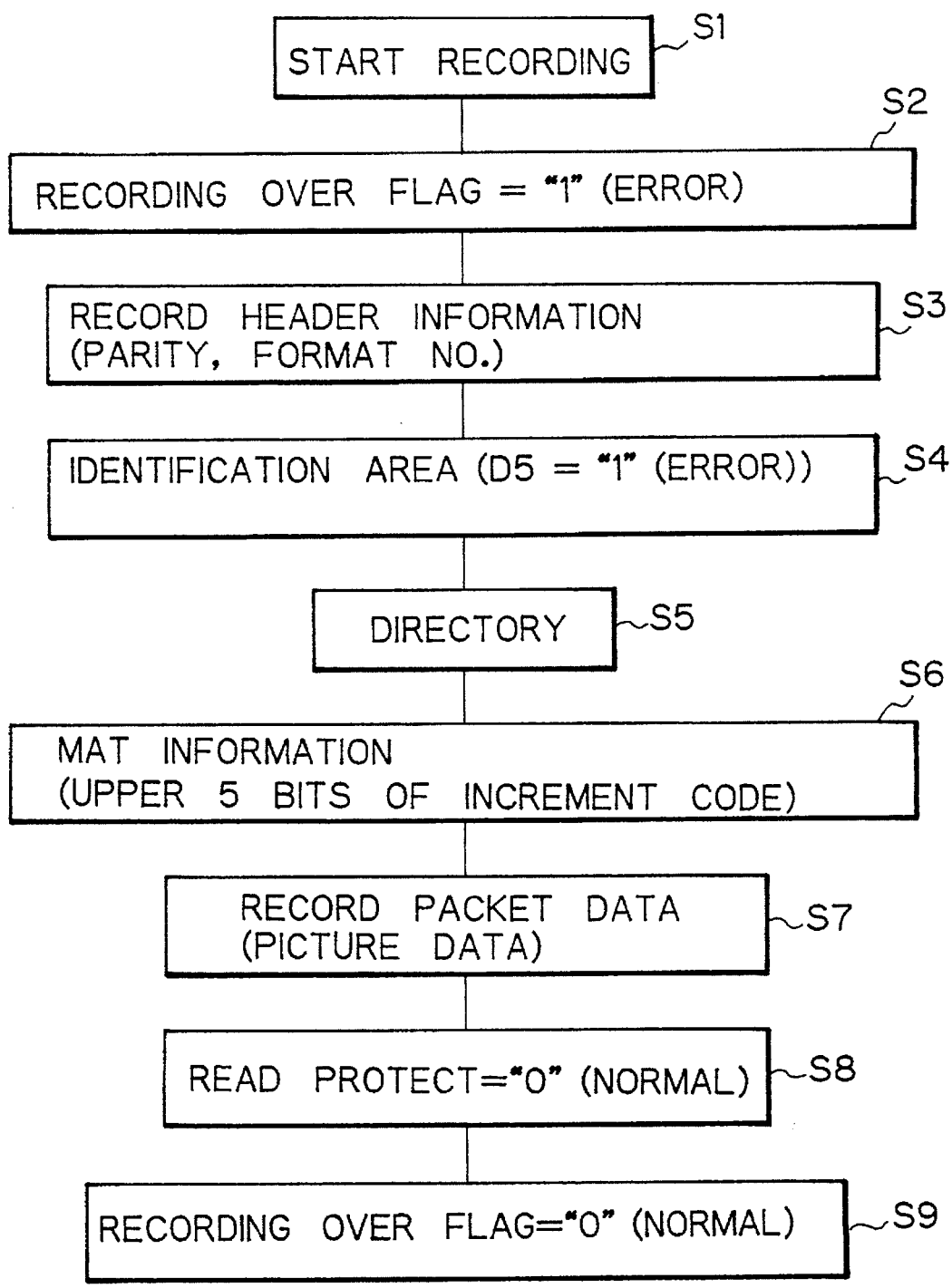

Fig. 16

| CASE | RECORDING OVER FLAG | PARITY | FORMAT NO. | IDENTIFICATION CODE | ABNORMALITY DETECTION BIT |
|---|---|---|---|---|---|
| CASE1 | "1" (ERROR) | DISCORDANCE | INDEFINITE (ERROR) | EMPTY | "0" (NORMAL) |
| CASE2 | "1" (ERROR) | COINCIDENCE | "DSIO" (NORMAL) | EMPTY | "0" (NORMAL) |
| CASE3 | "1" (ERROR) | COINCIDENCE | "DSIO" (NORMAL) | DISCONTINUOUS (ERROR) | "1" (ABNORMAL) |
| CASE4 | "1" (ERROR) | COINCIDENCE | "DSIO" (NORMAL) | CONTINUOUS (NORMAL) | "1" (ABNORMAL) |
| (INITIAL STATE) | INDEFINITE | DISCORDANCE | INDEFINITE | INDEFINITE | INDEFINITE |

MEMORY CARD MANAGEMENT SYSTEM FOR WRITING DATA WITH USAGE AND RECORDING CODES MADE SIGNIFICANT

BACKGROUND OF THE INVENTION

1. Field of the Invention

The present invention relates to a control and management system for a memory card such as an IC (Integrated Circuit) memory card for storing data such as picture data in the memory card and for managing the data stored in the memory card.

2. Description of the Related Art

Recently, there become such a tendency that an IC memory card using a semiconductor memory is used as a storage medium which is adapted to readily store therein image data obtained by image data sources such as digital electronic still cameras and the like as well as character data made up with processor systems such as computers.

As a semiconductor memory used in IC memory cards, it has been scrutinized that an EEPROM (Electrically Erasable Programmable Read-Only Memory), which does not require any back-up battery for maintaining memory contents, is adopted in the IC memory card. For example, the IC memory card, which is disclosed in U.S. patent application No. 07/832,394 assigned to the same assignee as that of the present application, comprises a block erasing type of EEPROM which has a large capacity storage device in which stored is primary data such as image data and the like, as well as a byte-rewriting type of storage device in which stored is secondary data such as management information for the primary data. The latter type of storage device is adapted for rewriting data on a byte-by-byte basis. That IC memory card further comprises a control unit for controlling and managing those storage devices to store the data. The use of such a memory card makes it possible to provide a larger capacity of IC memory with lower cost than an IC memory card using an SRAM (Static Random Access Memory),for example. Further similar to the IC memory card using the SRAM, it is rendered possible to freely rewrite or up-date the supervisory data on a byte-by-byte basis.

An IC memory card control device, which controls recording and/or reading out various sorts of data in and/or from the above-mentioned IC memory card, is loaded into an electronic still camera, for example, so that information such as image or picture data obtained by means of photographing by this camera is recorded on the IC memory card which is detachably coupled with the memory card control apparatus. In this case, the IC memory card is obliged to store a great amount of picture data, and thus time required for recording will be elongated. Further, the IC memory card using the above-mentioned EEPROM needs a complicated control for data writing, different from the IC memory card using the SRAM. Hence, time required for data recording will become long. In view of these matters, the IC memory card using the EEPROM is provided with a predetermined storage capacity of a buffer, and is so arranged that data, which are transferred from the IC memory card control device and temporarily stored in the buffer, are read out therefrom under the control of the controller provided on the IC memory card and then written into a flushing type of EEPROM.

In the case where data are recorded on such an IC memory card, however, after completion of transfer of the data from the IC memory card control device to the IC memory card, the data is actually firstly stored in the buffer in the IC memory card. Thus, there are possibilities of occurrence of a so-called hot-line ejection such that the IC memory card is ejected from the IC memory card control device while data are being written into the EEPROM within the IC memory card from the buffer, and of turn-off of the power supply for the IC memory card control device during writing operation for data. In this case, the midway data have been written in a storage area of the IC memory card and thus incomplete data will remain therein. There is a problem such that the IC memory card control device, to which the IC memory card subjected to the hot-line ejection is connected later on, does not identify which data is incomplete data. For instance, there is a need such that image data recorded on the IC memory card are read out, and the read out image data are displayed on a CRT display unit so that a person estimates the quality of the image. In this instance, assuming the worst, if the IC memory card control device is used to read out the destroyed data, the device would stop the operation. Further, since the flushing type of EEPROM is not adapted to erase only optional data, the halfway written data would remain in such an area of the IC memory card as an unavailable area. Consequently, there is a problem such that the storage areas of the IC memory card cannot be efficiently used.

Further, now referring to the systems using the memory card as mentioned above, for example, a memory card management system for storing in a memory card picture data representative of an image captured together with supervisory data representative of the order of the storage and an indication of a storage area occupied is proposed by Japanese Patent Laid-Open Publication Nos. 286077/1988 and 193236/1990 in the name of the assignee of the present application. According to those memory card management systems, a memory card is provided with a storage area which is segmented into a plurality of clusters to manage the storage of data on an cluster-by-cluster basis. The relationship of ones of those clusters in which a field of image data is stored, for example, is defined by a memory allocation table (MAT) and a cluster in which the beginning portion of the field of image data is indicated on a directory. Management information on the management table called the MAT, the directory and the like is first read out when picture data is recorded with an electronic still camera for example, so that storage locations for picture data to be newly stored in the memory card are determined, and in addition the associated management information is produced and recorded onto the memory card.

It has been customary with a memory card for such an application as to implement the semiconductor memory in the form of an SRAM which promotes rapid data reading and writing operations. However, since an SRAM is a volatile semiconductor memory, a memory card with an SRAM needs a back-up battery for preventing data from disappearing. Another problem is that an SRAM capable of storing a great amount of data such as picture data is expensive, increasing the overall cost of an IC memory card implemented thereby. In light of the above, an EEPROM, which is nonvolatile so as not to require a back-up battery and is inexpensive, is now adopted in an IC memory card.

The EEPROM is capable of holding data therein for more than ten years without a battery. Some advanced EEPROMs are comparable with an SRAM in respect to the reading and writing rates and are as inexpensive as about one-fourth of SRAMs. According to the EEPROM, a rewriting operation for data needs three steps, including the first step in which the previously written data is erased, the second step in which new data is written, and the third step in which it is verified whether the new data has been exactly written. EEPROMs are generally classified into two types. One is the type of EEPROM in which all data or a single page, sector or similar block of data stored is erased or flushed at a time, which is called the flushing type. The other is the type of EEPROM in which data stored is erased byte by byte.

However, since the memory card using those EEPROMs are provided with a large number of steps comparing with the SRAMs, it is difficult for the host end to completely grasp their processings. Thus, if the memory card is erroneously ejected from the utility equipment in the mid course of processing in the card, or if the power supply to the system is suddenly turned off owing to power consumption of the battery or any other causes, the host end cannot, after the equipment is revived, identify which ones of the whole processings have been completed in the card, whereby it is difficult to perform a reliable processing operation. In this case, there often happens a great difference between a memory management area and a state of data actually written, and there is a danger such that the halfway written data area may be estimated as a defective area. As a result, even if the later writing is normally carried out, it is difficult to satisfactorily restore the area concerned at the time of power turned off or hot-line ejection, and thus there is a fear of occurrence of such a problem that the equipment stops in its operation. Specifically, in the case where the card is ejected during an operation for writing of data on the management area, even if the data are normally written, it is impossible to develop the contents of the card, since management information for managing such data is not satisfactorily renewed. In the worst case, there is a danger such that the memory card concerned cannot be used thereafter. Further, if it is intended to erase only a field of image data determined defective, another data which is not intended may be erased in accordance with an erroneous MAT. Thus, the conventional system has been associated with such a drawback that other data are destroyed.

SUMMARY OF THE INVENTION

It is therefore an object of the present invention to provide an IC memory card control system capable of efficiently using storage areas by restoring an IC memory card which has been subjected to a hot-line ejection.

Another object of the present invention is to provide a memory card management system in which even if there happen situations such as a hot-line ejection of a memory card or unexpected turn-off of the power supply during writing operation for data or management information into the memory card, the host end is able to identify, at the time of resumption of writing of data and reproduction of data, which data or management information are defective.

According to the present invention, in an IC memory card control system including an IC memory card provided with a plurality of data areas in which data is stored and management areas in which management information is stored for management of recording the data into the data areas, and an IC memory card control apparatus to which the IC memory card is detachably mounted to store therein management information as well as the data, the management area of the IC memory card is provided with an identification area into which written are an occupation code indicative of recording of the data in the data area and a recording code indicative of an abnormal recording of the data in the data area, and the IC memory card control apparatus provides such a control that when writing the data into the data area, prior to data writing, the occupation code and the recording code are written into the identification area in a significant state, and after having completed the data writing the recording code is absolved from the significant state.

Further, in accordance with the invention, in an IC memory card control system including an IC memory card provided with a plurality of data areas in which data is stored and management areas in which management information is stored for management of recording the data into the data areas, and an IC memory card control apparatus to which the IC memory card is detachably mounted to store therein management information as well as the data, the management area of the IC memory card is provided with an identification area into which written are an occupation code indicative of recording of the data in the data area and a recording code indicative of an abnormal recording of the data in the data area, and the IC memory card control apparatus provides, upon detection of data containing the occupation code in a significant state and the recording code in a significant state from the management area, such a control that pieces of information stored the management area and the data area are saved, the IC memory card is initialized, thereafter normally recorded data are extracted on the basis of the occupation code and the recording code, and the management information corresponding to the extracted data is stored in the management area, while the extracted data is stored in the data area.

Still further, according to the present invention, an IC memory card control system, wherein an IC memory card, which is provided with a plurality of data areas in which data is stored and management areas in which management information is stored for management of recording the data into said data areas, is detachably mounted to an IC memory card control apparatus so that management information as well as the data are stored in said IC memory card, said system comprising: an IC memory card provided with an identification area into which written are an occupation code indicative of recording of the data in the data area and a recording code indicative of an abnormal recording of the data in the data area; a management information reader for reading out management information stored in the management area; a management information updater for updating the management information read out by said management information reader; and a data recorder for writing the data into said IC memory card, wherein the management information updater provides such a control that when writing the data into the data area, prior to the data writing, the occupation code and the recording code are written into the identification area in a significant state, and after having completed the data writing the recording code is absolved from the significant state.

Still further, according to the invention, in a memory card management system for managing recording and reproducing of data for a memory card which is detachably mounted on a host apparatus, the memory card is provided with a management area in which management information for managing data is recorded, the management area including at least a header area in which header information indicating an occupation state of data area is stored, a data identification area in which data identification indicating a format in read or write of data is stored, and a data allocation information area in which data allocation information indicating a continuity state between the data is stored, and the host apparatus is operative, in recording of the data into the memory card, to provide such a control that a recording start flag indicative of a recording start is written into the header area, and thereafter substantial contents of the header information is written into the header area, the host apparatus being operative to write, after having written the header information into the header area, a data identification including an abnormality detection flag for abnormality detection into the data identification area, the host apparatus being operative to record, following the data identification, data allocation information including an identification code indicative of a normality of the information in the data allocation information area, the host apparatus being operative to record data after normal writing has been effected in the management area, and to release the abnormality detection flag after the recording of the data, the recording start flag being released for the successive data recording into the memory card.

Still further, according to the present invention, a memory card is provided with a management area into which management information for recorded data is written, and is detachably mounted on a host equipment. This card includes a relatively small capacity of first storage element provided with the management area, and a relatively large capacity of second storage element provided with a data area in which data are recorded. The first storage element is provided with at least a header area in which header information indicating an occupation state of data area is stored, a data identification area in which data identification information indicating a format in read or write of data is stored, and a data allocation information area in which data allocation information indicating a continuity state between the data is stored. The header area includes a first effective bit corresponding to a recording start flag indicative of a recording start, said data identification area including a second effective bit corresponding to an abnormality detection flag for detection of an abnormality during recording. The data allocation information area is provided with a code area consisting of a plurality of bits which form an identification code for confirming a normality of the information.

Still further, in according to the present invention, in a memory card management system is disclosed on which a memory card capable of recording plural pieces of management information together with data is detachably mounted, wherein recording data of said memory card is managed. The memory card management system comprises: a management information reader for sequentially reading the pieces of management information when the memory card is mounted on the system; a flag detector for detecting an abnormality flag included in the management information read out; and a management information alterer for detecting abnormal portions of the management information on the basis of the abnormality flag detected by said flag detector to restore the detected abnormal portions.

BRIEF DESCRIPTION OF THE DRAWINGS

The objects and features of the present invention will become more apparent from consideration of the following detailed description taken in conjunction with the accompanying drawings in which:

FIGS. 13A and 13B are views each showing a specific format of a packet identification included in the memory card according to the embodiment shown in FIG. 8;

FIGS. 14A–14E show specific formats of MAT information included in the memory card according to the embodiment shown in FIG. 8;

FIG. 15 is a flow chart showing an operational procedure for recording according to the embodiment shown in FIG. 8;

FIG. 16 shows the states of flags and codes in various cases according to the embodiment shown in FIG. 8.

DESCRIPTION OF THE PREFERRED EMBODIMENTS

Figure 1:
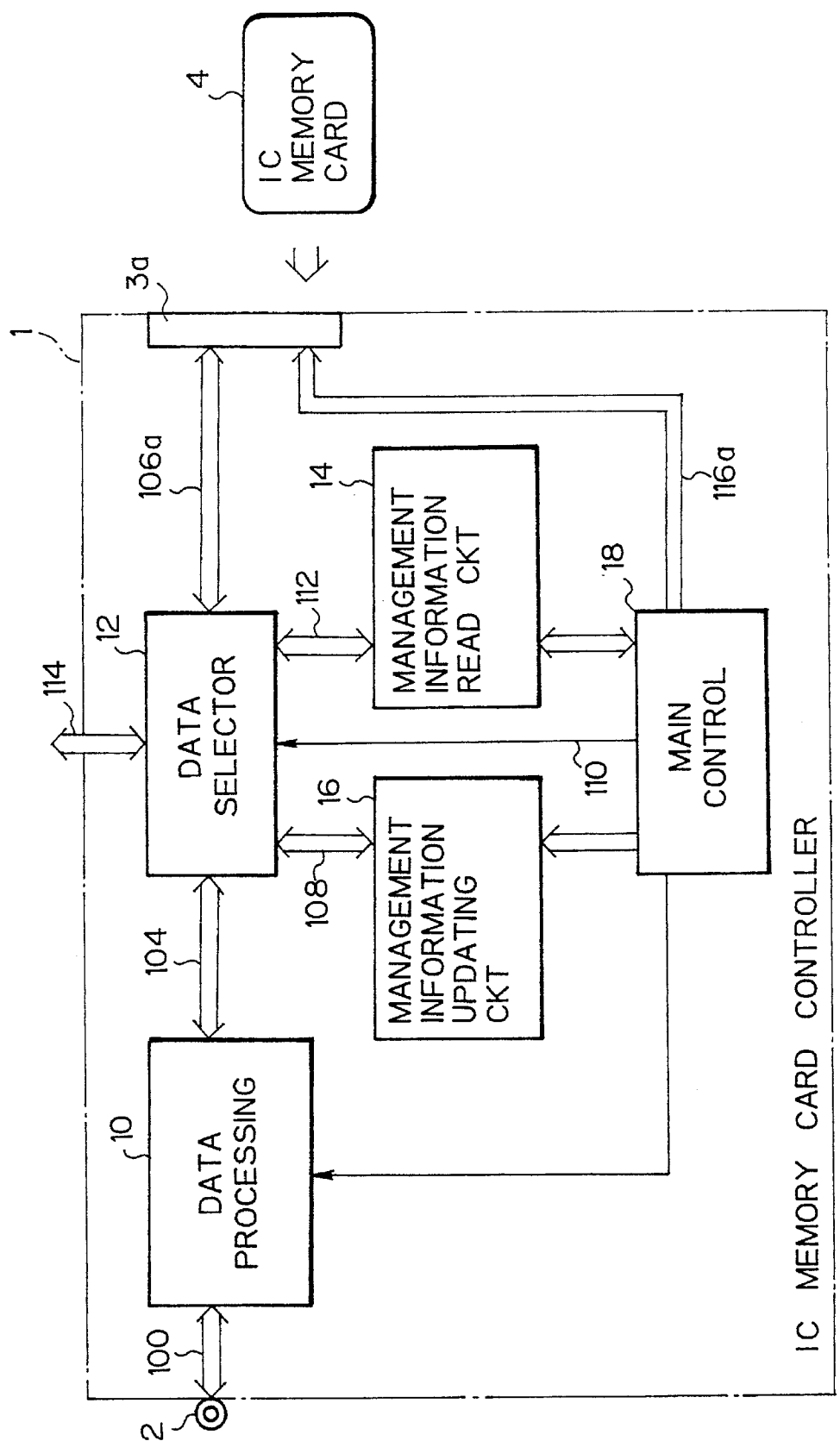
FIG. 1 is a block diagram schematically showing a preferred embodiment of the IC memory card control apparatus to which an IC memory card control system according to the present invention is applied.

Referring to the accompanying drawings, further details of the embodiments of an IC memory card control system will be described hereinafter. According to an IC memory card control system of the present embodiment, as shown in FIG. 1, an IC memory card control device 1, with which equipped is a digital electronic still camera, not shown, which is adapted for photographing a field and producing picture data representative of the field, processes the picture data received on a terminal 2 from the electronic still camera to store the picture data in an IC memory card 4 adapted to be detachably connected to a connector 3a with which the IC memory card control device 1 is equipped. The picture data stored in the IC memory card 4 are in turn read out therefrom and processed so that the processed picture data are developed from the terminal 2 to be transferred to the digital electronic still camera.

The IC memory card control device 1 comprises a data processing circuit 10 for providing compression encoding and expansion decoding for picture data supplied to the terminal 2. The control device 1 also includes a data selector 12 for writing into the IC memory card 4, mounted on the connector 3a, data which are subjected to the digital processing through the data processing circuit 10 and developed on a bus 104, and management data representative of supervisory information for the former data. The data selector 12 is also adapted for reading out data stored in the IC memory card 4 on a bus 106a. The control device 1 is further equipped with a management information read circuit 14 for reading out the management data stored in the IC memory card 4 through the data selector 12, and a management information updating circuit 16 for generating management data to be written into management areas of the IC memory card 4. The control device 1 has a main control 18 for controlling the operations of the control device 1 per se as well as the IC memory card 4 to read data from or write data in the IC memory card 4.

The data processing circuit 10 processes data appearing on a bus 100 and data transferred from the IC memory card 4 to convert those into predetermined formats of data. The data processing circuit 10 is provided with, for example, such a data compression processing function that picture data appearing on the bus 100 through the terminal 2 is encoded block by block, each of the blocks including a plurality of pixels, compressed into a predetermined length of data and temporarily stored, which is in turn outputted on the data bus 104. In addition, the data processing circuit 10 is provided with, for example, such a data expansion processing function that the data appearing on the bus 104 is decoded and outputted to the bus 100 so that the decoded data is transmitted to the digital electronic still camera through the terminal 2.

The data selector 12 serves as a bus selection circuit for selecting input and output of the picture data and the management data. More specifically, the data selector 12 is operative to selectively develop on the bus 106a the data appearing on the bus 104, and the data appearing on buses 108 and 112 in response to a bus selection signal appearing on a line 110 from the main control 18. The data selector 12 is also operative to selectively deliver the data appearing on the bus 106a to the bus 104 and the bus 108 or 112. The bus 106a of the data selector 12 is connected to the connector 3a. The buses 112 and 108 are connected to the management information read circuit 14 and the management information updating circuit 16, respectively. The data selector 12 is further operative to transfer the data appearing on the bus 106a to a bus 114 and reversely the data appearing on the bus 114 to the bus 106a in response to the bus selection signal appearing on the line 110 of the control circuit 18. The bus 114 is connected to, for example, a data storage device, not shown, for recording data on a recording medium such as a floppy disk or the like, so that, in the card restoring mode which will be described later, data to be restored are transferred on the bus 114.

The management information read circuit 14 reads the management data representative of supervisory information stored in a management area of the IC memory card 4, and transmits the same to the control circuit 18. More specifically, the management information read circuit 14 has such a function that addresses with which the management data is read out are made up under the control of the main control 18, and the generated addresses are outputted over the bus 112 to the data selector 12 to read out the management data recorded on the IC memory card 4 therefrom. The management information read circuit 14 has a further function such that the read management data is temporarily stored.

The management information updating circuit 16 renews or updates the management data under the control of the main control 18. More specifically, the management information updating circuit 16 has such a function that supervisory data to be written into the IC memory card 4 are made up and temporarily stored on the basis of the management data read out by the management information read circuit 14, and the supervisory data is transmitted on the bus 108 so that the management data recorded on the IC memory card 4 is renewed. The management information updating circuit 16 has a further function such that addresses with which the management data is written into the IC memory card 4 are made up under the control of the main control 18, and the thus generated addresses are outputted on the bus 108 to the data selector 12.

The main control 18 controls IC memory card control device 1 per se to drive the IC memory card 4 coupled to the connector 3a. More specifically, the main control 18 has such a function that write signals, which are meant for writing into the IC memory card 4 the picture data encoded by the data processing circuit 10 and the supervisory data produced by the management information updating circuit 16, are made up, and when data recorded on the IC memory card 4 are read out, read signals for reading out the data are made up, those write and read signals being outputted on the control bus 116a. The main control 18 has a further function such that a bus selection signal for causing the data selector 12 to select picture data or management data is made up and outputted on the line 110. The main control 18 functions, in addition, as producing a status signal representative of the state of the bus selection on the control bus 116a in synchronism with the bus selection signal. The control bus 116a conveys the status signal for read and write, the additional status signal indicating whether the signal on the data bus is an address or data, and the control signal for data transfer clocking and the like outputted from the main control 18. The bus 106a transfers the management data, the picture data and the addresses.

Both bus 116a and 106a are connected to the connector 3a and then to the associated buses of the IC memory card 4 which is installed by means of the connector 3a. The connector 3a is coupled to a connector 3b provided on the IC memory card 4 shown in FIG. 2, so that the bus 106a connected to the connector 3a is coupled to the bus 106b of the IC memory card 4, and similarly the control bus 116a to the control bus 116b. In the following description, those buses which are coupled with each other are generally denoted as bus 106 and control bus 116, respectively.

Figure 2:
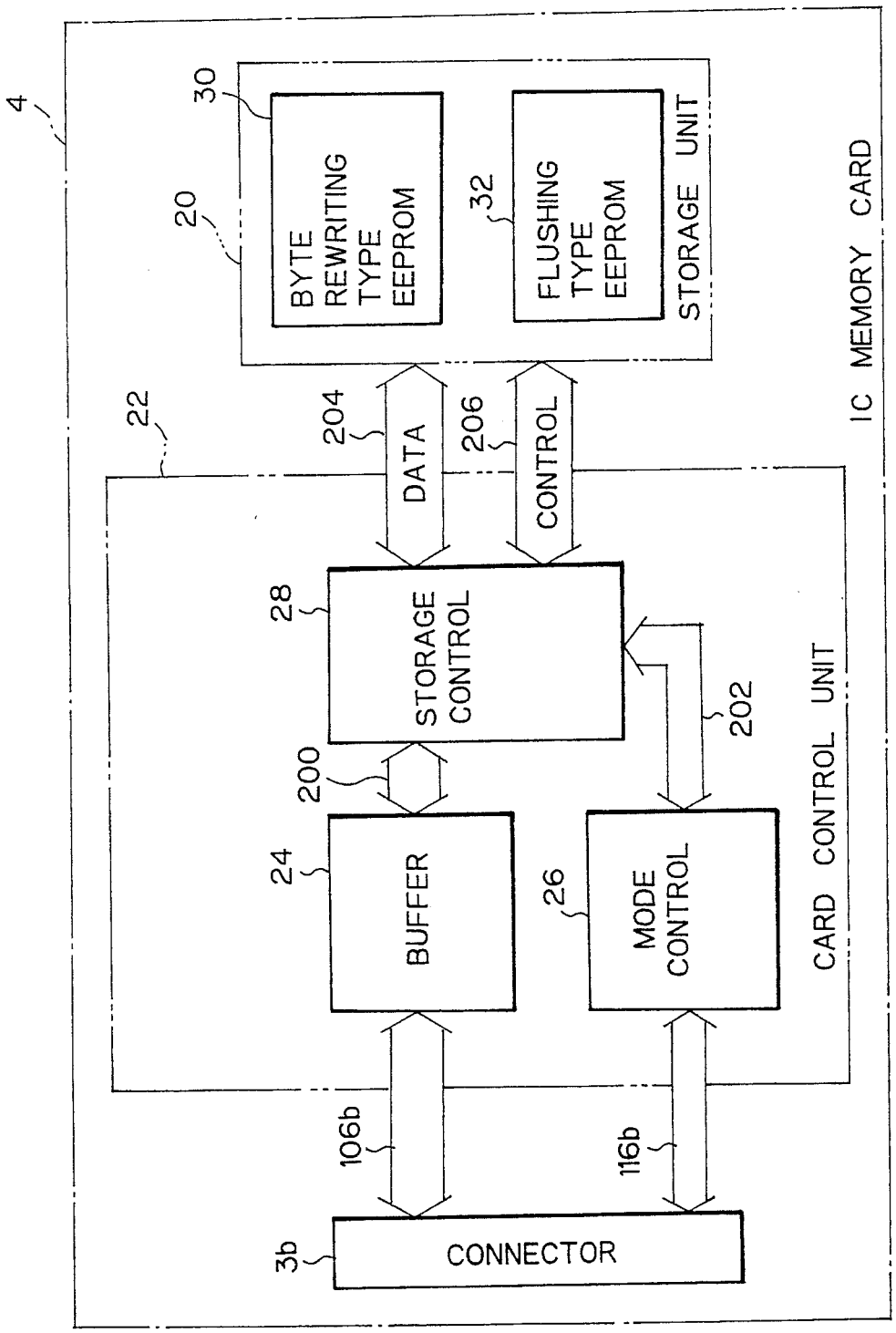
FIG. 2 is a block diagram schematically showing an IC memory card according to the embodiment shown in FIG. 1.

In the present embodiment, the IC memory card 4 is a non-volatile information storage medium in which picture data outputted to the connector 3a of the IC memory card control device 1 are stored, and from which the stored picture data are read out through the connector 3a to the IC memory card control device 1. For example, as shown in FIG. 2, the IC memory card 4 comprises a memory or storage unit 20 in which stored are picture data and management data, a card control unit 22 for controlling the memory unit 20, and the connector 3b serving as transferring data when IC memory card 4 is set to the connector 3a of the IC memory card control device 1.

The memory unit 20 comprises two different types of EEPROMs, i.e. a byte rewriting type EEPROM 30 capable to rewrite data on a byte-by-byte basis, and a flushing type EEPROM 32 adapted to erase data on a predetermined erasing block-by-block basis, and also to write data on a block-by-block basis. The byte rewriting type EEPROM 30 has therein a supervisory area in which stored are various kinds of management data, e.g. the data relating to the IC memory card 4 and the data relating to data recording. On the other hand, the flushing type EEPROM 32 has a data area in which stored is picture data or similar data as distinguished from the management data. The data area formed in the flushing type EEPROM 32 is so designed that the data stored therein may be erased in the unit of 8 kilobytes, for example. The supervisory area and the data area each have a bank structure comprising a plurality of blocks, each bank having maximum 16 megabytes of storage capacity. The bank structure may be given by a first bank #0 to a maximum bank #255. According to the present embodiment, the IC memory card 4 is constituted by the bank #0 only.

Figure 3:
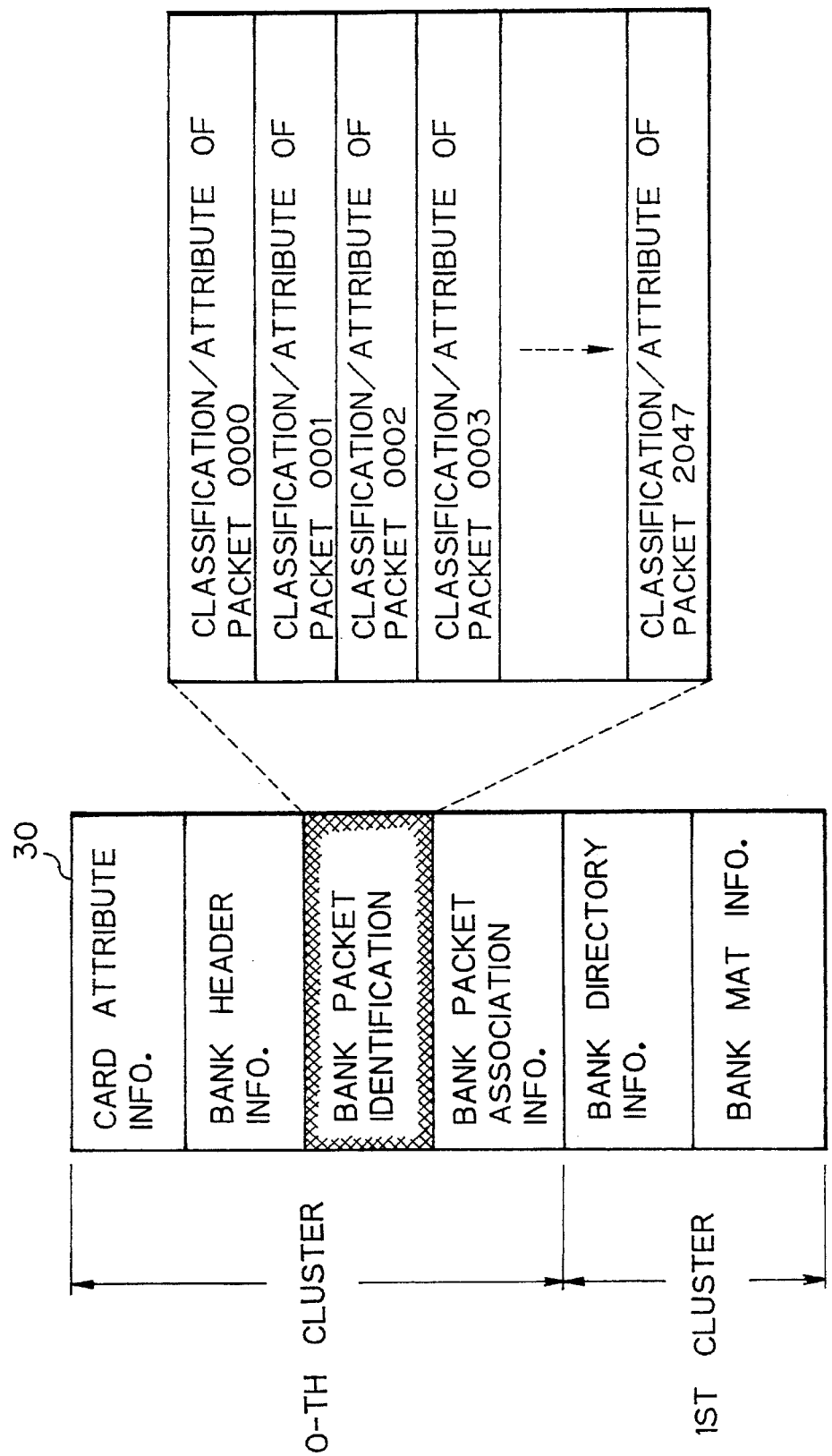
FIG. 3 shows a specific format of the supervisory area included in the IC memory card according to the embodiment.
Figure 4:
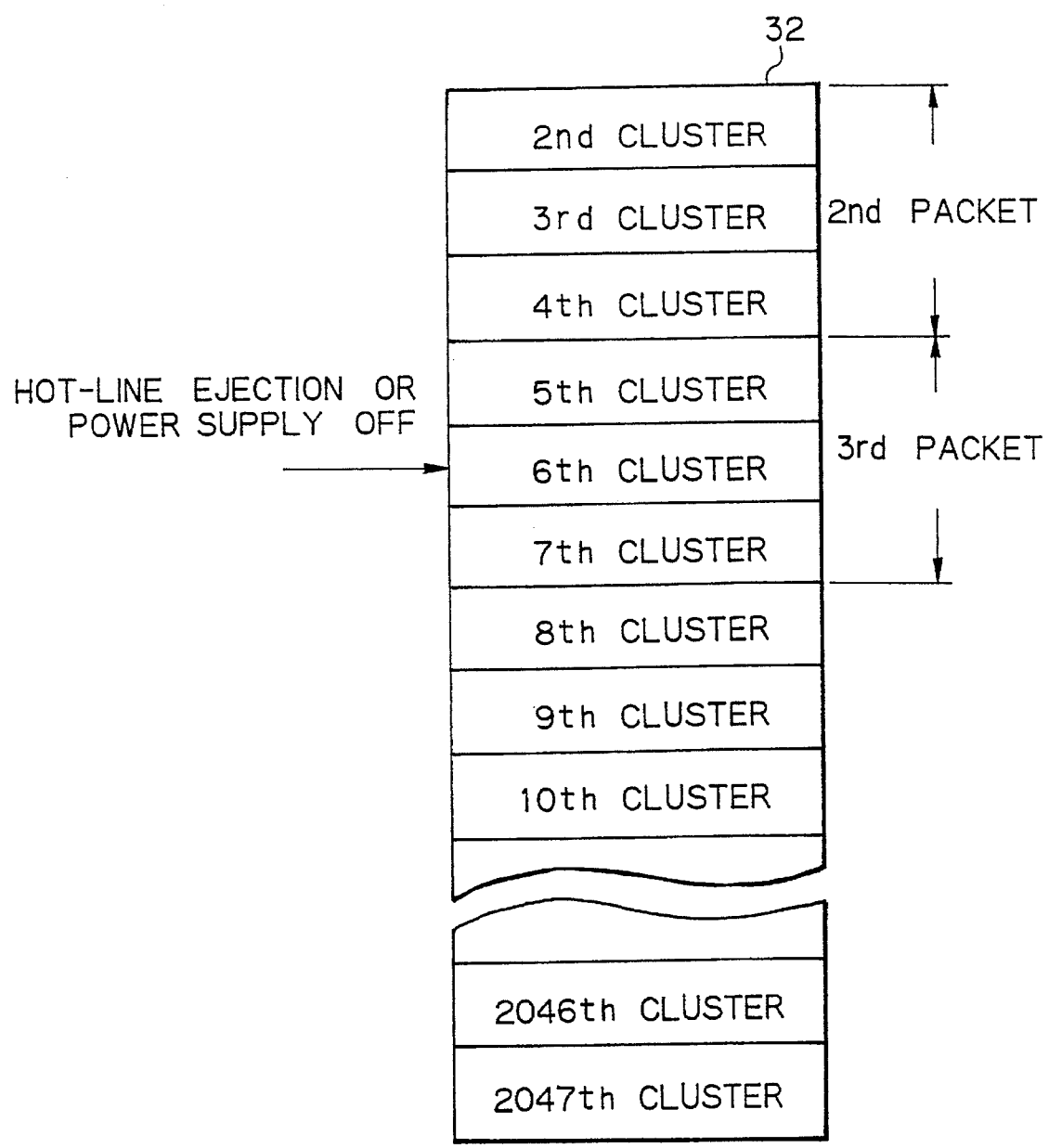
FIG. 4 shows a specific format of the data area included in the IC memory card according to the embodiment.

As shown in FIG. 3, the supervisory area of the bank #0 has the 0-th cluster and the first cluster each being set up with 8 kilobytes. On the other hand, as shown in FIG. 4, the data area has the second to 2047th clusters, each being set up with 8 kilobytes in the unit of data recording. The picture data is recorded in the form of packet adopting the above clusters as a minimum unit. In the present embodiment, as shown in FIG. 4, the second packet representative of the first picture data occupies the second cluster to the fourth cluster. Similarly, the fixed length of picture data occupying three continuous clusters on each packet is treated in the embodiment. It may be arranged, however, in such a way that each of the packets is recorded in the discontinuous clusters.

Now again referring to FIG. 3, recorded in the 0-th cluster is card attribute information, such as information on a memory structure in the bank and a memory size. Also recorded are bank header information including the using state of the memory in the data area, a bank packet identification representative of the attribute of the packet and classification of the picture and voice data constituting the packets as a unit of picture data, for example, and bank packet association information indicating the associated packet.

Figure 5:
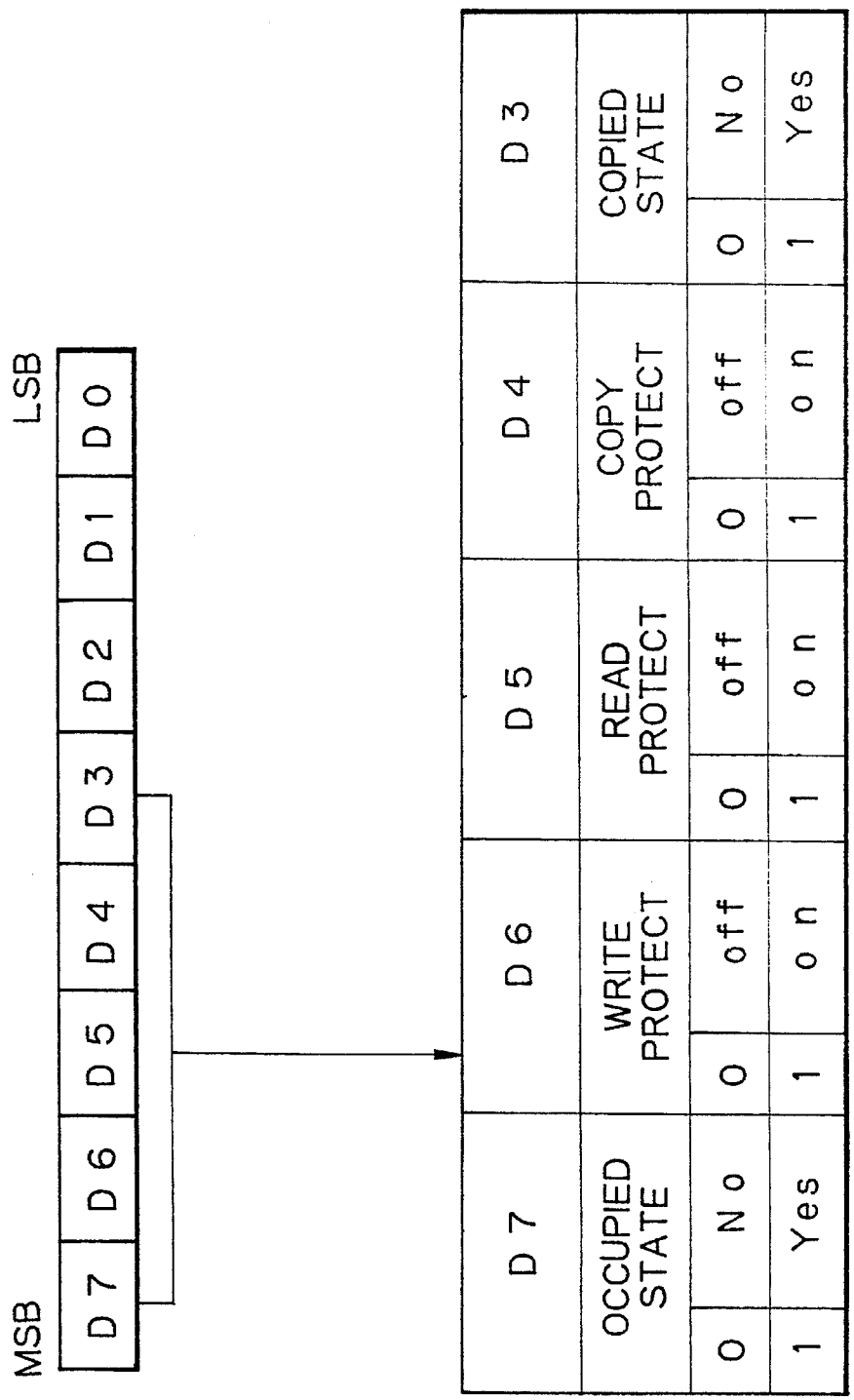
FIG. 5 shows a specific format of an identification for a bank packet included in the IC memory card according to the embodiment.

Specifically, as shown in FIG. 5, data related to the classification/attribute of the respective packets recorded in the packet identification are each constituted by a byte of data, of which the upper five bits are used to represent the attribute of the packet. For example, the bit D7 is directed to an occupied bit indicating that the data has been recorded in the associated packet; the bit D6 a write protect bit indicating that any data are prohibited from being written into the IC memory card 4; the bit D5 a read protect bit indicating that any data are prohibited from being read out from the IC memory card 4; the bit D4 a copy protect bit indicating that the IC memory card 4 is prohibited from being copied; and the bit D3 a copied state bit indicating that the data of the associated packet has been copied.

Particularly, in the present embodiment, the read protect bit D5 is used as a normal recording code. For example, if the occupied state bit D7 indicates "occupied" and the read protect bit D5 is given with binary "0", then this means that the associated packet is of data normally completely recorded. On the other hand, if the read protect bit D5 is given with binary "1", then this means that the associated packet is of picture data abnormally or irregularly recorded.

Recorded in the first cluster are bank directory information representative of the start clusters of the respective packets, and bank MAT (Memory Allocation Table) information representative of how the clusters constituting a packet are associated or chained with each other. The picture data are read out from the clusters on the basis of the bank directory information and the bank MAT information. The management data recorded in the management areas set up in the 0-th and first clusters may be recorded or renewed in accordance under the control of the card control unit 22 of the IC memory card 4.

Again referring to FIG. 2, the card control unit 22 comprises a buffer 24 in which temporarily stored are picture data and addresses appearing on the bus 106, a mode control 26 responsive to a control signal appearing on the control bus 116 for controlling the operational mode of the card control unit 22, and a storage control 28 for controlling a storage unit 20 in the operational mode established by the mode control 26 to write data stored in the buffer 24 and the storage unit 20 into each other.

The buffer 24 serves as a memory circuit in which data is temporarily stored, and which has a port connected through the bus 106b to the connector 3b, and another port connected through the bus 200 to the storage control 28. The buffer 24 functions to absorb the difference between the writing rate of data into the storage unit 20 and the transfer rate of data to be transferred from the IC memory card control device 1. As the buffer 24, advantageously adopted is a static RAM having a storage capacity which is N times as much as the erasure unit of the flushing type EEPROM 32, where N is a positive integer. With the present embodiment, the buffer 24 has 8 kilobytes of storage capacity.

The mode control 26 provides information of the operational mode to the storage control 28 connected to the control bus 202 in accordance with the control signal appearing on the control bus 116. More specifically, the mode control 26 sends out to the control bus 202 mode control signals such as an address mode signal, an erasure mode signal, a write mode signal and a read mode signal, corresponding to a status signal representative of the state that an address appears on the bus 106, a status signal of read/write appearing on the bus 116, a status signal indicating whether the signal on the data bus is a data address or data, and a control signal such as a data transfer clock. The mode control 26 further functions to monitor the buffer and the operational state of the storage control 28 and send out to the control bus 116 a ready signal permitting acceptance of data to be transferred on the bus 106 to the buffer 24 and a busy signal refusing acceptance of the data.

The storage control 28 serves as a memory controller for writing data into the storage unit 20 in response to the mode control signal transferred from the mode control 26 over the control bus, and for reading out data stored in the storage unit 20. More specifically, the storage control 28 functions to make up a control command according to the mode control signal transferred from the mode control 26 and then send it out on the control bus 206 so that the data stored in the storage unit can be read out therefrom or erased, and to write the data temporarily stored in the buffer 24 into the storage unit 20. For example, upon receipt of the erasure mode signal from the mode control 26, the storage control 28 sends out an erasure command to the storage unit 20. Similarly, upon receipt of the write mode signal, the storage control 28 sends out a write command to the storage unit 20, and upon receipt of the read mode signal, the storage control 28 sends out a read command to the storage unit 20. Further, upon receipt of the address mode signal, the storage control 28 reads out on the bus 200 the address temporarily stored in the buffer 24 and latches the same. The storage control 28 interprets the latched address and outputs on the bus 204 the associated address data designating a storage area of the byte rewriting type EEPROM 30 incorporated into the storage unit 20, or the associated address data designating a cluster of the flushing type EEPROM 32. The storage control 28 is operative, in accordance with the command and the address data sent out to the storage unit 20, to output on the bus 204 the picture data temporarily stored in the buffer 24 and write the same into the storage unit 20, or to read out the data stored in the storage unit 20 and send out the same to the buffer 24. In writing data, the storage control 28 is operative to first erase data in a storage area of the flushing type EEPROM 32, which storage area is associated with an address for the new data to be written, then read out the picture data from the buffer 24, and write the data into the storage area.

Referring to FIG. 1, the main control 18 of the IC memory card 1 will be described more in detail hereinafter. The main control 18 has a function such that prior to recording or reading out data, management information read out from the storage unit 20 of the IC memory card 4 by the management information read circuit 14 is recognized. More specifically, in a recording mode in which picture data is recorded in the IC memory card 4, the control circuit 18 causes the management information read circuit 14 to read out the management information such as bank header information, bank packet identification, bank directory information and bank MAT information which are recorded in the 0-th and first clusters of the IC memory card 4, so that empty ones of the information areas are determined. Further, the main control 18 causes the management information updating circuit 16 to renew or update the management data read out by the management information read circuit 14, and provides such a control that picture data and the associated management data are recorded or renewed on the IC memory card 4 and the picture data stored in the IC memory card 4 are read out therefrom.

The main control 18 provides such a control that picture data are recorded in such a manner that abnormal recording over data, which remains in the IC memory card 4 owing to interruption in writing data into the storage unit 20 of the IC memory card 4, can be readily detected. More specifically, the main control 18 controls the management information read circuit 14 to read out management data from the management area of the IC memory card 4. Further, the main control 18 recognizes management data read out by the management information read circuit 14, and causes the management information updating circuit 16 to make up management data, which has an occupied-state bit of the bank packet identification and another bit, which is the read protect bit. Both of those bits are given by the binary value "1". The main control 18 controls the management information updating circuit 16 to write the made up management data into the management area of the IC memory card, and thereafter write the picture data of the associated packet into the information area. The main control 18 functions to rewrite the read protect bit of the bank packet identification with the binary number "0" changed from "1", when the writing operation for the packet data into the information area is completed. The read protect bit "0" indicates that the normal recording for the packet data has been completed. That is, the read protect bit "0" denotes a normal recording over code, and "1" an abnormal recording over code.

Further, the main control 18 functions to search for a packet which has been subjected to abnormal writing of picture data, on the basis of the management data recorded on the IC memory card 4, and to perform the card restoring processings. More specifically, the main control 18 controls the management information read circuit 14 to read out the bank packet identification recorded in the management area of the IC memory card, so that the packet number of the picture data subjected to abnormal recording is determined. Upon detecting the abnormal recording over data, the main control 18 switches over to a card restoring processing mode without performing read out of the determined packet. In the card restoring processing mode, all data recorded on the IC memory card 4 are saved, and only normal packet data are extracted to be written into the IC memory card 4. For example, when management data is read out in response to a turning on of the power supply after loading the IC memory card 4 to the connector 3a of the IC memory card control device 1, or when management data is read out after mounting a new IC memory card 4 on the IC memory card control device 1, the main control 18 identifies the packet number having a read protect bit "1" which has been stored in the management area of the IC memory card 4.

The main control 18 further functions to detect an abnormal packet on the basis of the bank MAT of the management data read out. This is implemented in such a way that the continuity state of the clusters constituting a specific packet included in the bank MAT information is checked to identify the number of the packet having an abnormal cluster continuity. Upon detecting the abnormal packet having the significant read protect bit "1" and the packet having an abnormal cluster continuity, the main control 18 provides such a control that all data stored in the IC memory card 4 are read out therefrom on the bus 114 so as to be saved into the data storage device connected to the bus 114, and then the management areas and the information areas of the IC memory card 4 are subjected to an initialization processing. In this case, the main control 18 extracts from the saved packet data one having the read protect bit "0" and the packet having an abnormal cluster continuity, and to write those into the initialized IC memory card 4.

Figure 6:
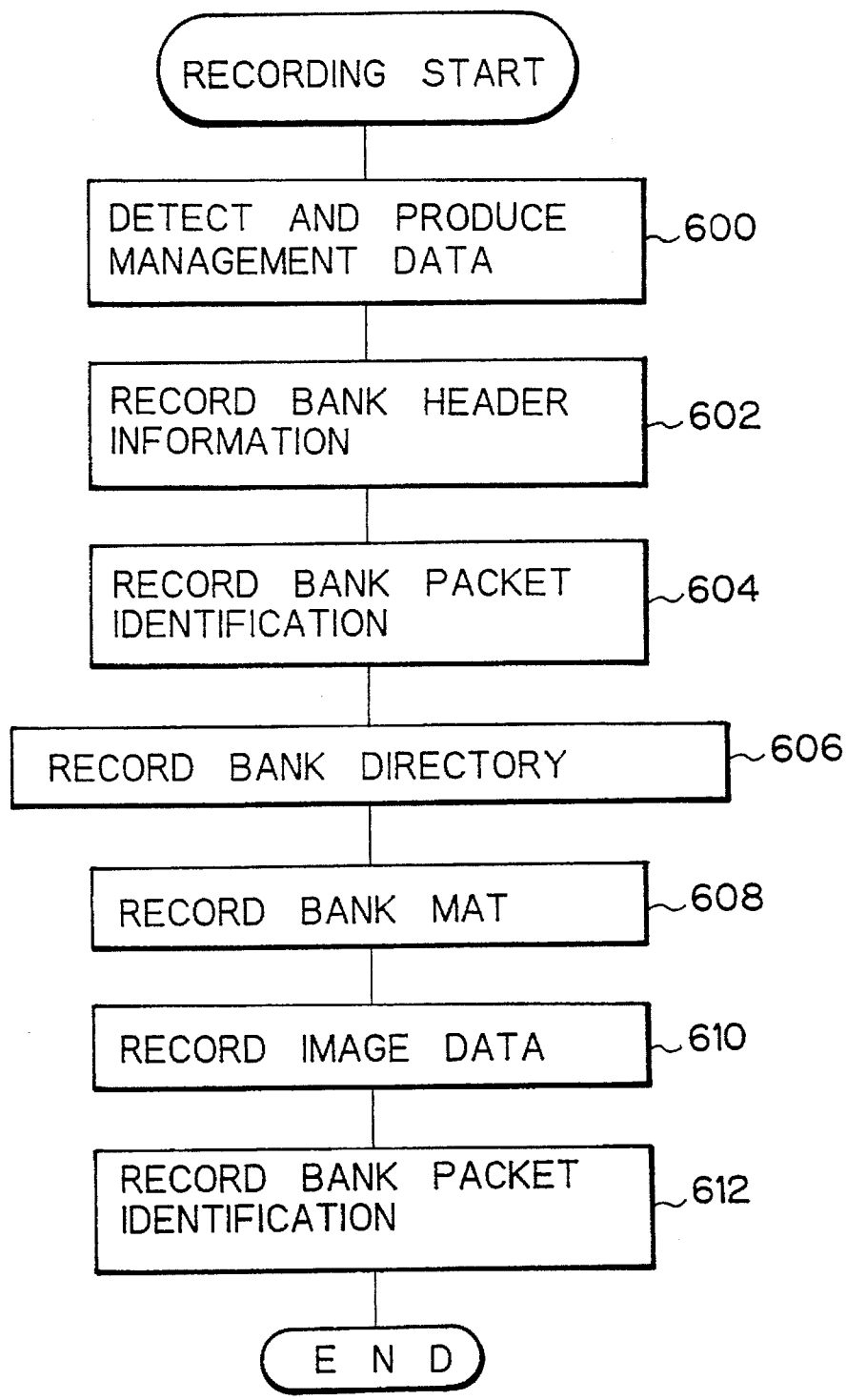
FIG. 6 is a flow chart showing an operational procedure of the IC memory card and the IC memory card control apparatus according to the embodiment in a writing mode.

A data recording operation of the IC memory card control device 1 described above in structure will be described referring to FIG. 6. In step 600 shown in FIG. 6, the management information read circuit 14 makes up an address addressing a management area of the byte rewriting type EEPROM 30 to read out management data stored in the IC memory card 4. When the main control 18 detects the ready signal sent out from the mode control 26 of the IC memory card 4 on the control bus 116, the bus selection signal on the line 110 is sent out to the data selector 12. When the bus selection signal is applied to the data selector 12, the address made up in the management information read circuit 14 is outputted on the bus 112 and sent out via the data selector 12 to the bus 106. On the other hand, the status signal representative of the output state of the address generated and the read signal for reading data of the address are outputted to the main control 18 and then sent out on the control bus 116. The read signal, the status signal sent out to the control bus 116 and the address outputted on the bus 106 are transferred through the connector 3a and the connector 3b shown in FIG. 2 to the card control unit 22 of the IC memory card control 1. The address outputted on the bus 106 is temporarily stored in the buffer 24, while the status signal and the read signal are supplied to the mode control 26. The read signal supplied to the mode control 26 is converted into the read mode signal and then outputted on the control bus 202.

The storage control 28 receives the read mode signal to make up the read command. The read command is sent out on the control bus 206 to the storage unit 20. Upon receipt of the read command, the storage unit 20 is set up in a read mode. On the other hand, the status signal supplied to the mode control 26 is transferred on the control bus 202 to the storage control 28. When the storage control 28 receives the status signal, the address stored temporarily in the buffer 24 is loaded onto the storage control 28 so that the address is converted into the associated address data in the storage unit 20. In this manner, the address data designating the 0-th cluster and the first cluster in which management data are stored are supplied to the storage unit 20.

Informing the storage unit 20 of the address data, the management data stored in the 0-th cluster and the first cluster of the storage unit 20 are read out on the bus 204. The read out management data are transferred via the buffer 24 to the bus 106, and further supplied via the data selector 12 of the IC memory card control 1 to the management information read circuit 14. When the management information read circuit 14 reads out the management data, the main control 18 detects the read out management data. The management information updating circuit 16 makes up, under the control of the main control 18, new management data to record the picture data temporarily stored in the data processing circuit 10 into the IC memory card 4 on the basis of the detected management data. More specifically, the management information updating circuit 16 makes up management data such as bank header information indicating that the picture data temporarily stored in the data processing circuit 10 is recorded in the form of the second packet, a bank packet identification representative of the classification and attribute of the second packet, bank directory information indicating that a record start cluster of the second packet is treated as the second cluster, and bank MAT information representative of the relationship between the clusters in recording of the second packet into the second cluster to the fourth cluster. Further, the management information updating circuit 16 makes up addresses indicating destinations of writing for the management data. In this case, both the occupied-state bit and the write protect bit of the bank packet identification are set to the binary "1".

In step 602, when the main control 18 detects the ready signal sent out from the mode control 26 of the card control unit 22 to the control bus 116, the bus selection signal is transmitted over the line 110 to the data selector 12, and the address is transmitted from the management information updating circuit 16 through the data selector 12 to the bus 106. On the other hand, the main control 18 sends out on the control bus 116 the write signal and the status signal indicating that the data on the bus 106 concerns the address. Next, data representative of the bank header information is sent out through the data selector 12 on the bus 106. The buffer 24 of the card control unit 22 temporarily stores the data representative of the bank header information and the data concerning the address appearing on the bus 106. When the mode control 26 receives the status signal and the write signal, a write mode signal is made up and transmitted to the storage control 28. When the storage control 28 receives the write mode signal, a write command is sent out to the storage unit 20, so that the storage unit 20 is set in the write mode. In the write mode, the storage control 28 reads out the data representative of the bank header information and the data concerning the address, which have been stored in the buffer 24, and outputs to the storage unit 20 the address data corresponding to the address and the management data representative of the bank header information. The management data supplied to the storage unit 20 is written into a predetermined storage area of the byte rewriting type of EEPROM 30 in response to the address data.

Similarly, in steps 604–608, the bank packet identification, bank directory information and bank MAT information, which are made up in the management information updating circuit 16, are sequentially outputted and written into the predetermined storage areas of the byte rewriting type EEPROM 30, respectively. According to the present embodiment, both the occupied-state bit and the write protect bit of the bank packet identification, which are set up in the management areas of the IC memory card 4, are given with the binary "1".

Next, the process goes to step 610. When the mode control 26 sends out the ready signal on the control bus 116, the address made up in the management information updating circuit 16 is transferred through the data selector 12 on the bus 106, and temporarily stored in the buffer 24 of the card control unit 22. The main control 18 produces on the line 110 a bus selection signal, while the data processor unit 10 outputs on the bus 104 the picture data stored therein. The picture data is transmitted through the data selector 12 on the bus 106, and temporarily stored in the buffer 24 of the card control unit 22. At that time, if the mode control 26 sends out a busy signal on the control bus 116, the main control 18 detects the busy signal and causes the data processing unit 10 to temporarily stop an output operation for the data. After changing the busy signal to the ready signal, the main control 18 causes the data processing unit 10 to resume the output operation for the data. On the other hand, the main control 18 sends out over the control line 116 a control signal for recording data into the IC memory mode 4. The card control 26 makes up a write mode signal on the basis of the write signal and the status signal appearing on the control bus 116, and transmits the same together with the status signal to the storage control 28. The storage control 28 makes up a write command to be sent out to the storage unit 20. Next, the storage control 28 reads out the address stored in the buffer 24 so as to make up the address data for designating the second cluster to the fourth cluster of the information area, and in addition sequentially reads out the picture data corresponding to the produced address data to the storage unit 20. The picture data are transmitted on bus 204 and recorded in the form of the second packet in the second cluster to the fourth cluster of the information area set up in the flushing type EEPROM 32.

When the recording of the picture data in step 610 is terminated, the process goes to step 612 wherein the read protect bit of the bank packet identification, which has been temporarily stored in the management information updating circuit 16, is renewed or updated from "1" to "0". The address and the management data representative of the bank packet identification of the second packet are transmitted through the data selector 12 over the bus 106. The management data and the address sent out on the bus 106 are temporarily stored in the buffer 24. On the other hand, the main control 18 transmits a control signal indicating data write over the control bus 116 to the mode control 26. Upon receipt of the control signal, the mode control 26 transmits an erasure mode signal to the storage control 28 so as to output an erasure command to the storage unit 20. In response to the erasure command, the storage unit 20 is set in an erasure mode. Successively, the storage control 28 reads out the address stored in the buffer 24 to transmit the address data corresponding to the address read out to the storage unit 20, so that the bank packet identification of the second packet is erased.

Further, the main control 18 sends out a write signal over the control bus 116 to the card control unit 22. Upon receiving the write signal, the card control unit 22 outputs a write command on the control bus 206 so that the storage unit 20 is set in a write mode. In the write mode, the storage control 28 reads out the address and the data representative of the bank packet identification of the second packet from the buffer 24 to transmit the address data corresponding to the address read out and the management data representative of the bank packet identification to the storage unit 20. The management data supplied to the storage unit 20 is written into a predetermined storage area of the byte rewriting type EEPROM 30, and thus an overall operation for the second packet is completed.

In this manner, picture data of the packets each representative of a picture are stored in the storage unit 20, and as shown in FIG. 4 picture data on and after the third packet are written into the IC memory card 4. In that case, assuming, for example, that there occurs the hot-line ejection in such a manner that the IC memory card 4 is ejected from the connector 3a of the memory card control device 1 during the recording operation for picture data in step 610 shown in FIG. 6, the writing operation for the picture data to the sixth cluster, for example, is interrupted. In this case, abnormal image data remain in the fifth cluster to the seventh cluster concerning the third packet which has been stored in the storage unit 20 of the IC memory card 4 in the form of both the occupied-state bit of the bank packet identification and the read protect bit being given by the binary "1".

Next, there will be described operations in the card restoring processing mode which permits the data to be read out from the IC memory card 4 subjected to the above-mentioned, hot-line ejection in which the third packet data having the read protect bit "1" is recorded.

Figure 7:
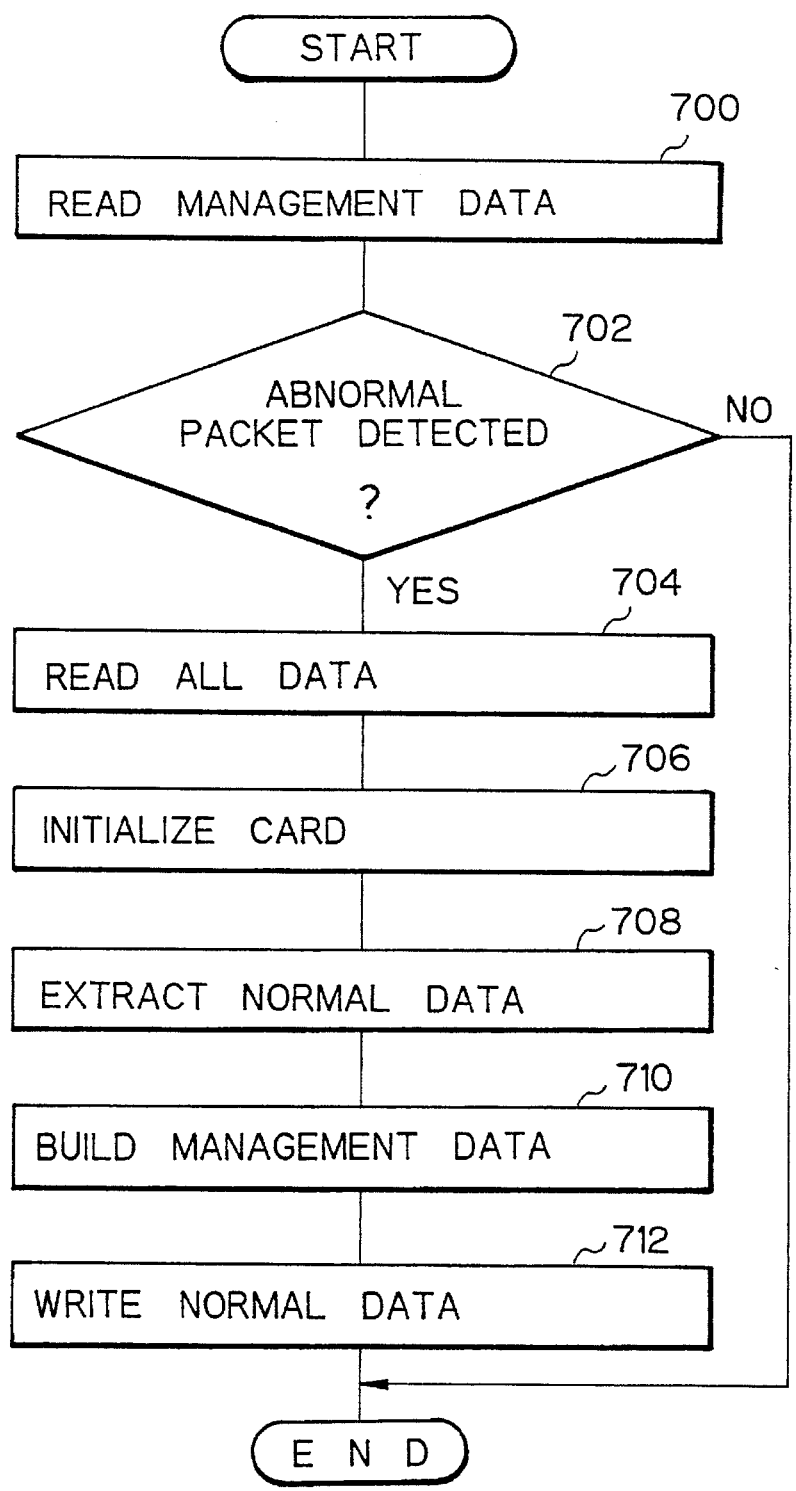
FIG. 7 is a flow chart showing operational procedure of the IC memory card and the IC memory card control apparatus according to the embodiment in a card restoring process mode.

When the IC memory card 4 is mounted on the connector 3a of the IC memory card control device 1, in step 700 shown in FIG. 7, the main control 18 sends out a bus selection signal on the line 110 to the data selector 12. Subsequently, the management information read circuit 14 makes up addresses for reading the 0-th cluster and the first cluster of the management area set up in the byte rewriting type EEPROM 30. Those addresses are sent out on the bus 106 through the data selector 12. On the other hand, the main control 18 sends out a read signal and a status signal on the control bus 116 to the card control unit 22. Upon receipt of the addresses and those signals derived from the IC memory card control device 1, the card control 22 reads out from the 0-th cluster and the first cluster the management data stored in the byte rewriting type EEPROM 30 of the storage unit 20 and outputs the same on the bus 106. The management data appearing on the bus 106 are supplied to the management information read circuit 14 through the data selector 12.

In step 702, if the main control 18 detects the packet having the read protect bit "1" of the bank packet identification among the management data read out, the process goes to step 704 in which data of all of the packets stored in the information areas set up in the flushing type EEPROM 32 of the IC memory card 4 are read out and transferred through the data selector 12 of the IC memory card control device 1 on the bus 114. The data on the bus 114 are transferred to a data storage device, not illustrated, connected to the bus 114, and saved by storing the data into the information storage medium such as a floppy disk.

Upon completion of the saving of all the data, the process goes to step 706 in which a control signal is sent out on the control bus 116 to initialize the management data stored in the management areas of the IC memory card 4 and the packet data stored in the information areas. Subsequently, the addresses for designating those management areas and the information areas are sent out from the management information updating circuit 16 through the data selector 12 to the bus 106. When the card control unit 22 detects those addresses and the control signals, address data and an erasure command are sent out from the card control unit 22 to the storage unit 20, so that the management data and the picture data, which have been stored in the management areas and information areas of the IC memory card 4, respectively, are erased. Thus, an initialization for the IC memory card 4 has been implemented. During the erasure operation for those data, a busy signal is sent out from the mode control 26 to the control bus 116. Upon completion of the erasure operation for data, the mode control 26 produces on the control bus 116 a ready signal instead of the busy signal.

In step 708, from among the packets given with the read protect bits "0", numbers of the packets which are normal in the continuity state of clusters are extracted on the basis of the management data temporarily stored in the management information updating circuit 16. In step 710, the management information updating circuit 16 makes up, based on the extracted packet numbers, management data representative of the management information to record those packets onto the IC memory card 4.

In step 712, picture data of those packets, which have been saved in the data storage device, not illustrated, connected to the bus 114, are read out, and the data of the packets are sent out through the data selector 12 on the bus 106 on the basis of the management data built by the management information updating circuit 16. Those data are stored in the management areas and the information areas of the IC memory card 4. At that time, only the packet data of the read protect bit "0", which indicates that the normal recording has been completed, are recorded onto the storage unit 20 of the IC memory card 4.

As apparent from the above description, according to the present embodiment, prior to the loading of the picture data provided on a packet basis, the occupied-state bit provided on each packet is set to the binary code "1", representative of "occupied", and the read protect bit is set to the binary code "1" representative of "abnormal recording over". After the normal recording for the picture data of the packet is implemented, the read protect bit is rewritten with the binary "0" representing "normal recording over". Thus, if the hot-line ejection of the IC memory card occurs during the writing operation for data, the IC memory card would contain the packet having the occupied-state bit "1" and the read protect bit "1". Consequently, it is possible to readily detect the packets subjected to the abnormal recording, without taking a complicated procedure such that all data recorded in the IC memory card 4 are read out by the IC memory card control device 1 to an output device such as a display unit so as to confirm the quality of the picture, and also to inhibit the data of the defective packets from being read out, thereby preventing data of the defective packets from being read out.

Further, when the IC memory card 4 in which the packet is recorded with the abnormal recording is mounted on the IC memory card control device 1, the packet provided with the read protect bit "1" is detected, so that a card restoring processing mode is given. In the card restoring processing mode, all packet data recorded in the information areas of the IC memory card 4 are saved, so that the IC memory card 4 is subjected to the initialization processing, and then data of the normal packets provided with the read protect bit "0" are written into the IC memory card 4. In this case, since the main control 18 extracts based on the bank MAT information the packets in which the cluster continuity is normal, the IC memory card 4 can be restored, for example, even if the hot-line ejection of the IC memory card 4 occurs in mid course of the bank MAT information being written into the information areas of the IC memory card 4, and thus the bank MAT information associated with the packet data already recorded is destroyed. Consequently, even if the hot-line ejection of the IC memory card 4 occurs so that the defective data subjected to the abnormal recording are retained in the storage areas thereof, it is possible to substantially remove the defective data to thereby efficiently utilize the storage capacity of the IC memory card 4.

According to the present embodiment as described above, the IC memory card control device 1 is arranged in such a way that all data are saved and only the normal data are extracted to be written into the IC memory card 4. This can be modified, however, for example, in such a manner that only the normal data stored in the IC memory card 4 are detected and saved, and after the initialization of the IC memory card 4 the saved data are written into the IC memory card 4.

Further, according to the present embodiment described above, while picture data made up by the digital electronic camera are treated, other data such as character data as well may be replaced for the picture data or image data.

Figure 8:
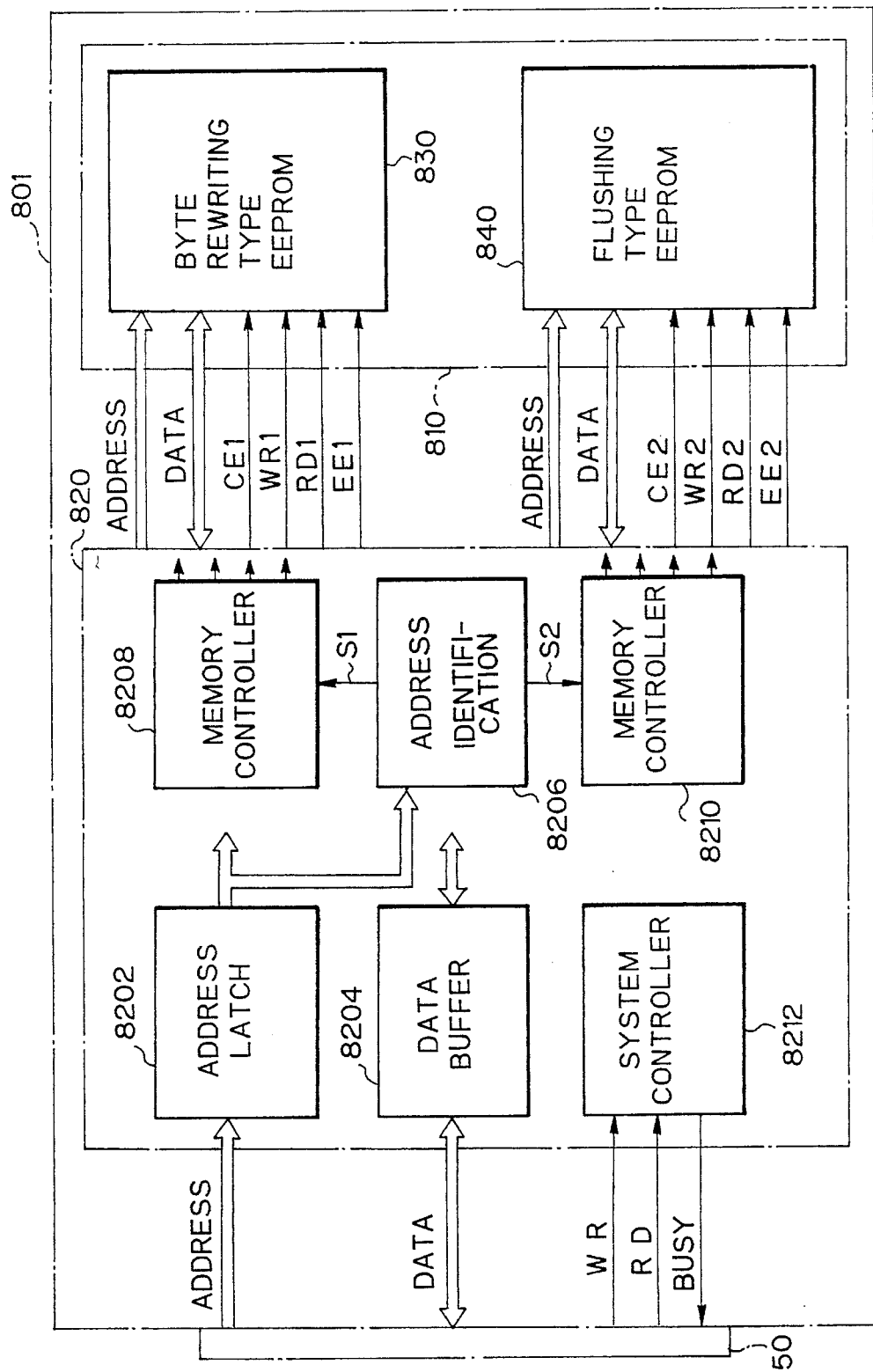
FIG. 8 is a block diagram schematically showing a preferred embodiment of the memory card to which a memory card management system according to the invention is applied.

Next, referring to the accompanying drawings, details of a further embodiment of a memory card management system will be given hereinafter. According to the memory card management system of the instant embodiment, for example, in a case where a memory card 801 shown in FIG. 8 is loaded in an electronic still camera 52 shown in FIG. 9, and the card 801 is erroneously ejected in mid course of recording data from the camera 52 to the card 801, it is possible to efficiently perform a processing after the restoration. For example, in the case of reproducing pictures from the memory card 801 by an electronic still picture player 500 shown in FIG. 10, it is possible to effectively read data, even if includes abnormal recording data.

The memory card 801, which is applicable to the present embodiment, comprises a data storage unit 810 and a memory control unit 820. The data storage unit 810 comprises two different types of EEPROMs, i.e. a byte or bit rewriting type of first EEPROM cell 830 capable of rewriting data on a byte-by-byte or bit-by-bit basis, respectively, and a flushing type of second EEPROM cell 840 adapted to erase data on a predetermined erasing block-by-block basis and also to write data on a block-by-block basis. The first EEPROM cell 830 is assigned to a supervisory data storage area involved in the management system according to the present embodiment. The first EEPROM cell 830 is constructed with a relatively smaller storage capacity, e.g. 16 kilobytes of EEPROM chip. On the other hand, the second EEPROM cell 840 is assigned to a data storage area in which stored is picture data or similar data as distinguished from the management data. The second EEPROM cell 840 is constructed with a relatively larger storage capacity, e.g. 16 megabytes of EEPROM chip.

Figure 11:
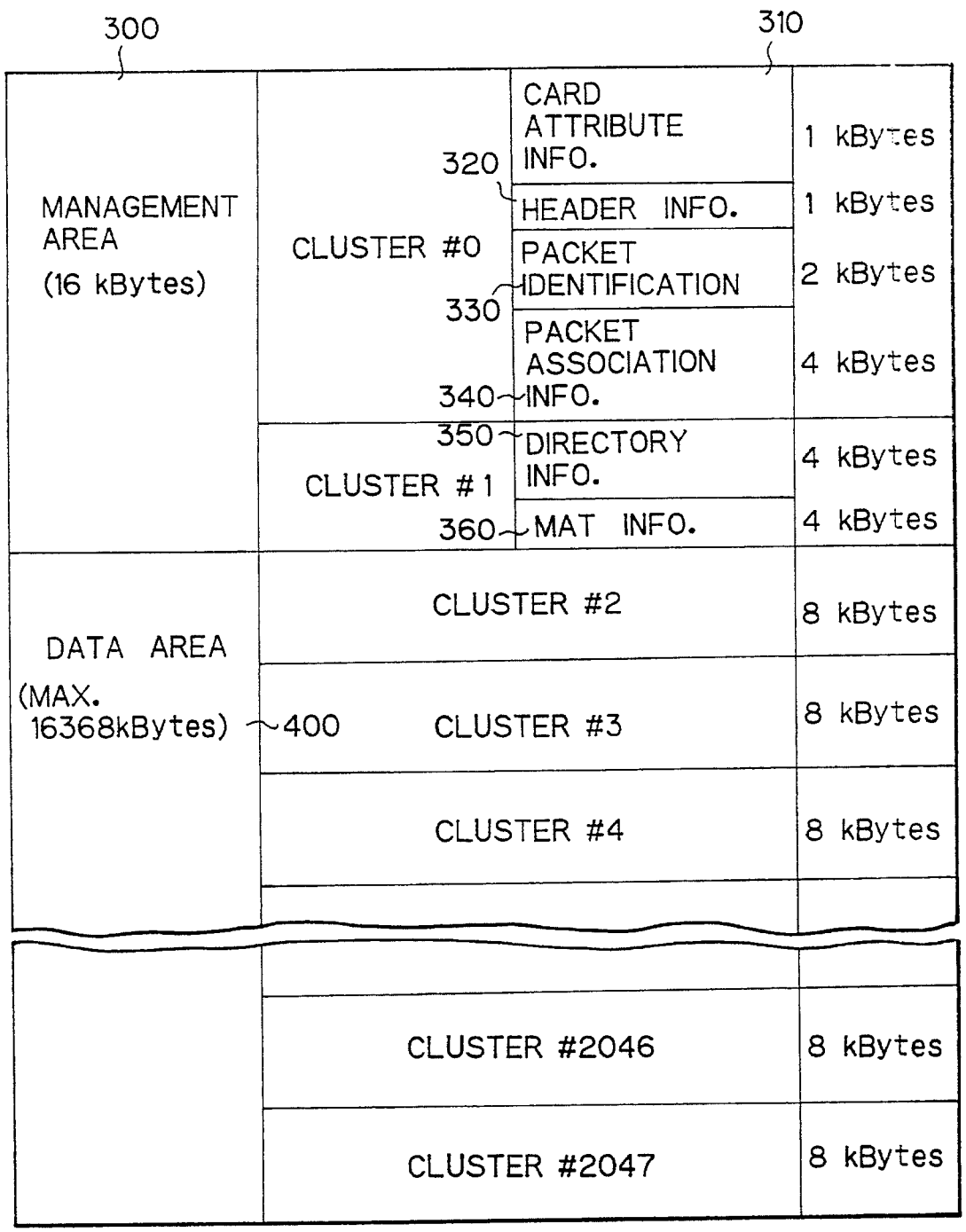
FIG. 11 shows a specific format of a recording area included in the memory card according to the embodiment shown in FIG. 8.

The memory areas assigned to these memory cells 830, 840 are, as shown in FIG. 11, each segmented in the unit of clusters as a minimum management unit of the memory. According to the present embodiment, the memory areas are segmented in the unit of 8 kilobytes into 2048 clusters #0–#2047. In the first EEPROM cell 830 to which the management area 300 is assigned, there are formed the clusters #0 and #1. In the second EEPROM cell 840 to which a data area 400 is assigned, there are formed the clusters #2–#2047. Assigned to the first cluster #0 of the management area 300 are a card attribute information area 310, a header area 320, a packet identification area 330 and a packet association information area 340. On the other hand, assigned to the second cluster #1 are a directory information area 350 and a memory allocation table (MAT) area 360. In the clusters #2–#2047 of the data area 400, there are stored data which represent a frame of image, for example, by a standard format of picture signals, or picture data extended over and distributed in an appropriate plurality of clusters in a so-called "packet" format. The continuity state of the clusters, which defines how those clusters are chained or related with each other to form the packet, is mainly managed in the management area 300.

Figure 12:
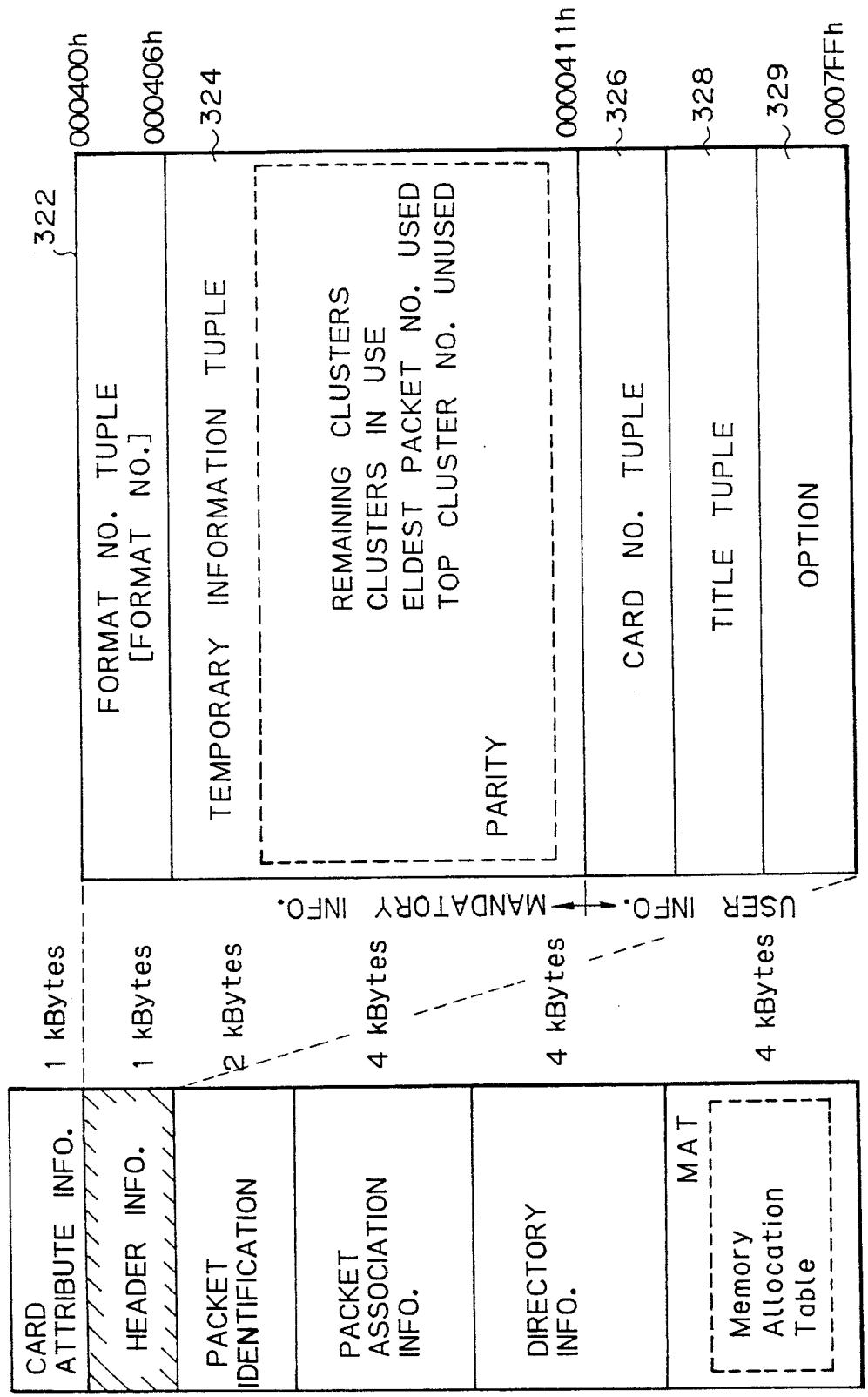
FIG. 12 shows a specific format of a management area and a specific format of header information included in the memory card according to the embodiment shown in FIG. 8.

To describe more in detail the management area 300, in the card attribute information area 310 there is stored information on the kind of card, the fabrication number of card, the whole capacity of the storage area, an identification label and the like. This card attribute information area 310 has been subjected to loading at the manufacturer's end, and thus there is no need at the user's end to rewrite it. The header area 320 is adapted for recording information in outline for data recording and information for users on a rewritable basis. Prior to writing data into the header area 320, the header area 320 is to be rewritten. According to the present embodiment, prior to rewriting the substantial contents of the header area 320, the recording termination flag is set up to the binary number "1", for example, which indicates that recording into the effective bits is started, and at the final time point of the data recording process, in other words, after complete recording of data such as picture data in the data area 400 following the management area 300, the recording termination flag is updated with the binary "0". The header area 320 includes, as shown in FIG. 12, information such as format number 322, temporary information 324, card number 326, title 328 and option 329, which are sequentially recorded. This information is given with a tuple structure in which a tuple identification is provided on each effective data, and updating and rewriting are performed on a tuple-by-tuple basis.

The format number 322 is written, at the time point of initialization and formatting of the data area 400, with the value corresponding to that format. The value is a regular value suitable for a version of the format, for example, a predetermined identification "DS10" consisting of 4 bytes. The format number 322 is collated in an apparatus which is loaded with the card. If those 4 bytes coincide with the regular value in the entirety, the apparatus enables both the regeneration and the recording to be performed. If only the certain lower bytes do not coincide with corresponding bytes of the regular value, the apparatus enables only the regeneration to be performed. If the upper bytes as well as the lower bytes do not coincide with the regular value, the apparatus is rejected to make access to the card. It is thus possible to effectively protect the recording data of the memory card 1 or other apparatus such as camera 52.

The temporary information 324 is written regarding the utility state of the EEPROMs 830 and 840 such as the number of remaining clusters, the number of occupied clusters, the number of the eldest packet used, the number of the top or youngest cluster not used, and a parity code. More specifically, the number of remaining clusters is indicative of the number of vacant clusters which are available for writing picture data in the data area 400. The number of occupied clusters is indicative of the total number of clusters in which data have been effectively written. Both the number of remaining clusters and the number of occupied clusters are compared with a memory capacity, which is previously written in the data attribute area, for example, so as to determine the compatibility of both numbers. The number of the eldest packet used is indicative of the number of the packet which has been used or data recorded therein and has the eldest packet number. The number of a top cluster unused is indicative of the number of the youngest one of the clusters which do not have data recorded in the data area 400.

The final byte of the temporary information 324 includes parity bits for use in checking whether or not the contents of the information involved in a corresponding bit position are correct. This parity check may be implemented, for example, in such a manner that the respective digits of the information represented by plural bytes each are subjected to addition in a vertical direction, and the value deleting the carry of the addition, i.e. the least significant bit is allotted. Alternatively, another check code system capable of error correction, such as CRC code correction, may be applicable. The card number 326 may be applied to every user and also may be written with an optional number. Similarly, the title 328 is information to be written independently by the user, and may be, for example, a title of the photographing pictures. In addition, there is provided a vacant area consisting of several bytes as an option area 329 for user's information.

Subsequent to the header area 320, there is provided the packet identification area 330 in which a packet identification is written. The packet identification is representative of the classification and attribute of the recorded packets. As shown in FIGS. 13A and 13B, there are allotted eight bits to each packet. More specifically, the first three bits D0, D1 and D2 are used to indicate the classification of the packet. For example, the binary number "000", which is written into the bits D0–D2, denotes that the packet is involved in picture information, and "001" denotes that the packet is involved in voice information. If the binary number "010" has been written into the bits D0–D2, it denotes that the information on the clusters #0 and #1 is involved in management information, assuming that the information recorded in the management area 300 is also of a packet. As another classification, for example, if there is written data which can be recorded for the purpose of utilization of the manufacturer, it is regarded as a packet, and the binary number "011" is written into the bit positions D0–D2 in the classification referred to as vender information.

Allotted to information representative of the attribute of the packets are the successive fourth to eighth bit. Assigned to the fourth bit D3 is a "copied-state" bit indicating whether the data has been copied in another area or memory. Assigned to the fifth bit D4 is a "copy protect" bit indicating whether or not the copy is allowed. If the binary nubmer "0" is written into those bit positions, it is indicative of "no copy" or "ready to copy". If the binary "1" is written into those bit positions, it is indicative of "presence of a copy" or "not copied". Assigned to the sixth bit D5 is an "abnormality detection" bit for use in detecting the occurrence of an abnormality during data recording, as one aspect of the present invention. When writing of data is started, the sixth bit D5 is set to "1", and after completion of the data recording, reset to "0". After reset of the "abnormality detection bit", the recording termination flag in the header area 310 is rewritten with the binary "0". Therefore, when data is reproduced with the "abnormality detection" bit D5 being in the binary state "1", it is interpreted that there has occured an abnormality in writing data following the packet identification area 330, i.e. the packet association information, the directory information, the MAT information or data in the data area 400. Further, if the "abnormality detection" bit D5 takes "0", and in addition the recording termination flag takes "1", it is interpreted that there has occured an abnormality in writing the header information which has been recorded preceding the packet identification. In other words, the "abnormality detection" bit D5 is a bit for use in checking abnormality encountered in recording which makes it possible to exactly confirm the abnormality in recording on the management area by using it in combination with the recording termination flag.

The seventh bit D6 of the packet identification is used as a protection bit which inhibits other data from being written in the address location, that is, preventing data from being rewritten. Only when the write protection bit D6 takes the binary "0", the writing is permitted. On the other hand, when the write protection bit D6 takes the binary "1", the writing is inhibited. The final eighth bit D7 is used as a bit which is indicative of the fact that the cluster of the associated address is occupied. The combination of the write protection bit D6 with the occupied-state bit D7 makes it possible to accurately identify whether or not a rewriting of data is permissible.

Again referring to FIG. 11, during the data recording, subsequent to the packet identification in the related area 330, the packet association information is written in the related area 340. The packet association information is indicative of the relationship between the packets. Assuming that some packet is involved in picture data, for instance, if the associated voice data for example is recorded in the form of another packet, the number of the packet or cluster involved in the associated voice data is recorded in the packet association information area 340. Thus, it is possible to readily read out the associated voice data as well as the picture data. Following the packet association information in the related area 340, the directory information is written in the related area 350 of the successive cluster #1. The directory information area 350 is loaded with the numbers of a start cluster of the respective packets. Consequently, retrieval of the directory information makes it possible to promptly and exactly extract the start of a desired packet.

The last of the management area 300 is loaded with a memory allocation table (MAT) information in the related area 360, which information is indicative of substantial recording positions of data. The MAT information is representative of the continuity state of a plurality of clusters over which a packet is written. Recorded in the MAT information area 360 are addresses of the continued clusters as cluster information. In the memory card management system according to the present embodiment, during writing of the MAT information, an identification code indicating whether the rewriting is effective is written utilizing the vacant area.

As seen from FIGS. 14A–14E, to the MAT information of each of the clusters #0 through #2047, a couple of bytes are assigned. For example, if it is assumed that a single packet is chained by the clusters #23, #24, #30 and #40, written in the directory information area 350 is the number "0017h" on a hexadecimal basis. That number is representative of the start cluster #23. Consequently, the MAT information of the cluster #23, FIG. 14B, to which the hexadecimal number "0017h" is meant includes the number "0018h" representative of the cluster #24 subsequent to cluster #23. Similarly, the MAT information of the cluster #24, FIG. 14C, to which the latter hexadecimal number "0018h" is directed includes the number "001Eh", which represents the cluster #30 subsequent to cluster #24; and the MAT information of the directed cluster #30, FIG. 14D, includes the number "0028h", which is representative of the cluster #40 subsequent to cluster #30. Recorded in the MAT information area of the cluster #40, FIG. 14E, is the number "FFFFh" on a hexadecimal basis, which hexadecimal number is represented by the whole bits of binary "1" indicating that the cluster #40 is the final cluster of that packet. With the instant example, the lower 11 bits of the overall two bytes are used to designate the number of effective clusters, i.e. up to the cluster #2047. The upper five bits of the overall two bytes, which are encircled by the dot-and-dash line in the figure, are used for recording of an identification code indicative of the validity of the MAT information of the packets in data recording. As the identification code, for example, in accordance with the present embodiment, a serial number is provided on each packet so that the effectivity of the information can be confirmed by confirming the continuity of the number.

For example, recorded in the MAT information area of the directed cluster #23, FIG. 14B, is the number "00001" indicating that it is the first MAT information. The MAT information of the successive cluster #24, FIG. 14C, includes the number "00010" representative of the second MAT information. The MAT information of cluster #30, FIG. 14D, successive thereto includes the number "00011" representative of the third MAT information. Similarly, the MAT information of the cluster #40, or the final information, FIG. 14E, includes the number "00100", which represents the fourth MAT information. According to the present embodiment, the identification code is provided by a serial number or an incremental code. However, the identification code may be provided by other numbers or codes such as a result from a logical operation on the effective bits, as is similar to the parity used in the header area 310, or alternatively a random number which varies in its initial value from packet to packet. A fixed value corresponding to the respective information may also be applicable. In the latter case, it is acceptable that on the side of camera 52, the respective information is held as fixed information in a ROM or the like storage device, so that the identification code is compared with the fixed information in the ROM.

Now again referring to FIG. 8, details of the control unit 820 of the memory card 801 will be described hereinafter. The control unit 820 includes an address latch 8202 for latching a recording address from the camera 52 via the connector 50. This address is identified by an address identification circuit 8206 as to whether the address from the address latch 8202 is directed to the first EEPROM 830 or the second EEPROM 840. In response to the results from the identification, the address identification circuit 8206 outputs signals S1 or S2 to activate the memory controllers 8208 or 8210, respectively. The memory controllers 8208 and 8210 will be enabled by the signals S1 and S2 generated from the address identification circuit 8206, respectively. Upon receiving the latch address from the address latch circuit 8202, the memory controllers 8208 and make access to the EEPROM 830 and the EEPROM 840, respectively. The memory controllers 8208 and perform an erasing control for erasing the contents of the addressed location, a write control such as data writing and verification, and a read control for reading out data.

The control unit 820 is provided with a data buffer 8204 in which temporarily stored is data from the camera 52. The data buffer 8204 is so designed that the data received via connector 50 is held during the periods of erasure and verification processings of the memory controllers 8208 and 8210. The system controller 8212 is operative, upon receipt of write signal WR or read signal RD from the camera 52, to activate the address latch 8202 and the data buffer 8204 so as to control the memory controllers 8208 and 8210. Specifically, according to the present embodiment, during recording, there is provided a recording control flag indicating that a recording is now being carried out inside, and in addition, while the memory controllers 8208 and 8210 perform operations for data erasure, write and verification, a busy signal BUSY indicating that an internal processing is now being performed is supplied to the camera 52. As the connector 50, the I/O bus system having 20 pins recommended by JEIDA (Japan Electronic Industry Development Association) is advantageously employed.

Figure 9:
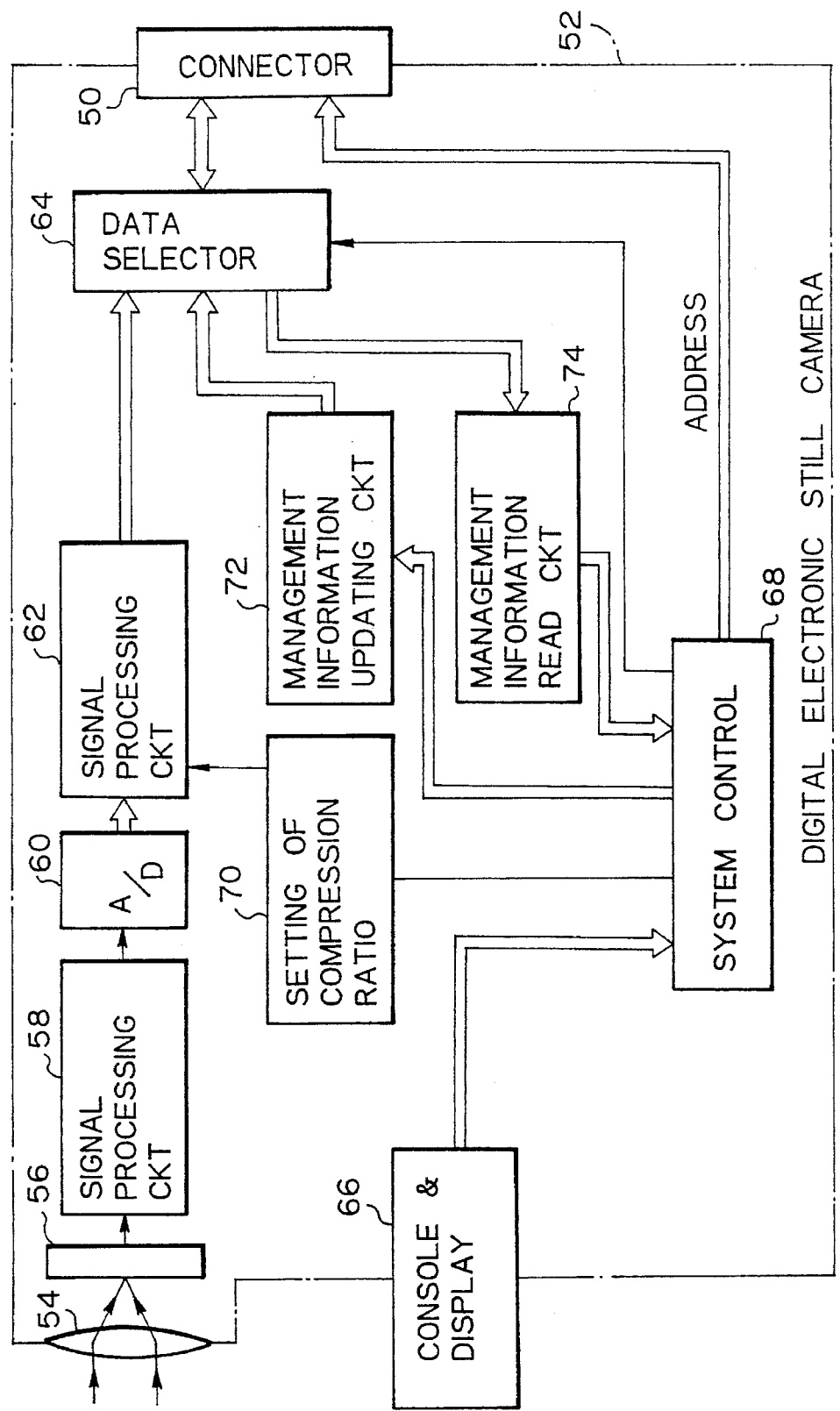
FIG. 9 is a functional block diagram schematically showing the structure of an electronic still camera which is applied to the embodiment shown in FIG. 8.

The digital electronic still camera 52, to which the above-mentioned memory card 801 is mounted, is a still picture photographing device, as shown in FIG. 9, which photographs a field by an image picking-up device 56 through an optical lens system 54 to store the image data representative of the field in a memory card 801. The picking-up device or image sensor 56 produces an output, which is in turn subjected to signal processing, such as color regulation, in a signal processing circuit 58 and converted into the corresponding digital data through an analog-to-digital (A/D) convertor circuit 60. Those digital data are processed with color separation and compression encoding in another signal processing circuit 62 and then transmitted to the connector 50 through a data selector 64. The camera 52 has a console and display 66, which receives various manual instructions such as exposure, data compression mode and write protect designations, and also indicates the state of the system to the user, such as alarm indicative of the state in which any idle cluster is not available to storing a record of image data. Console and display 66 transmits data representing the designations fed therein to a system control unit 68. The information on the state of the camera 52 is fed to the console and display 66 from the system control unit 68. The system control unit 68 is a control unit which not only controls the entire operations of the camera 52 but also writes data in the memory card 801.

Connected to the system control unit 68 is a compression ratio setting circuit 70 which is a circuit for setting the compression ratio of codes for image data to a signal processing circuit 62 in accordance with a data compress mode indicated by the console and display 66 under the control of the system control unit 68. As the compression coding method, an orthogonal transform such as a bidimensional cosine transform, or the sub-sampling, and the quantization are advantageously applicable. The data selector 64 is a selector circuit which sends out image data from the signal processing circuit 62 and control data involved in the system control unit 68 selectively through the connector 50 to the memory card 801. Connected to the data selector 64 are a management information updating circuit 72 and a management information read circuit 74. The management information updating circuit 72 is a circuit which generates information to be written in the management information area 300 of the memory card 801. The management information, which is read out into the management information read circuit 74 under the control of the system control unit 68, is modified and written. The management information read circuit 74 reads out the management information stored in management data area 300 of the memory card 801 and then feeds those to the system control unit 68. The management information, which is read out into the management information read circuit 74, is subjected to checking of the flag of the information, the format number, parity and the like. As the result from the checking, if no abnormality is found, then the procedure transfers to the data recording process.

Figure 10:
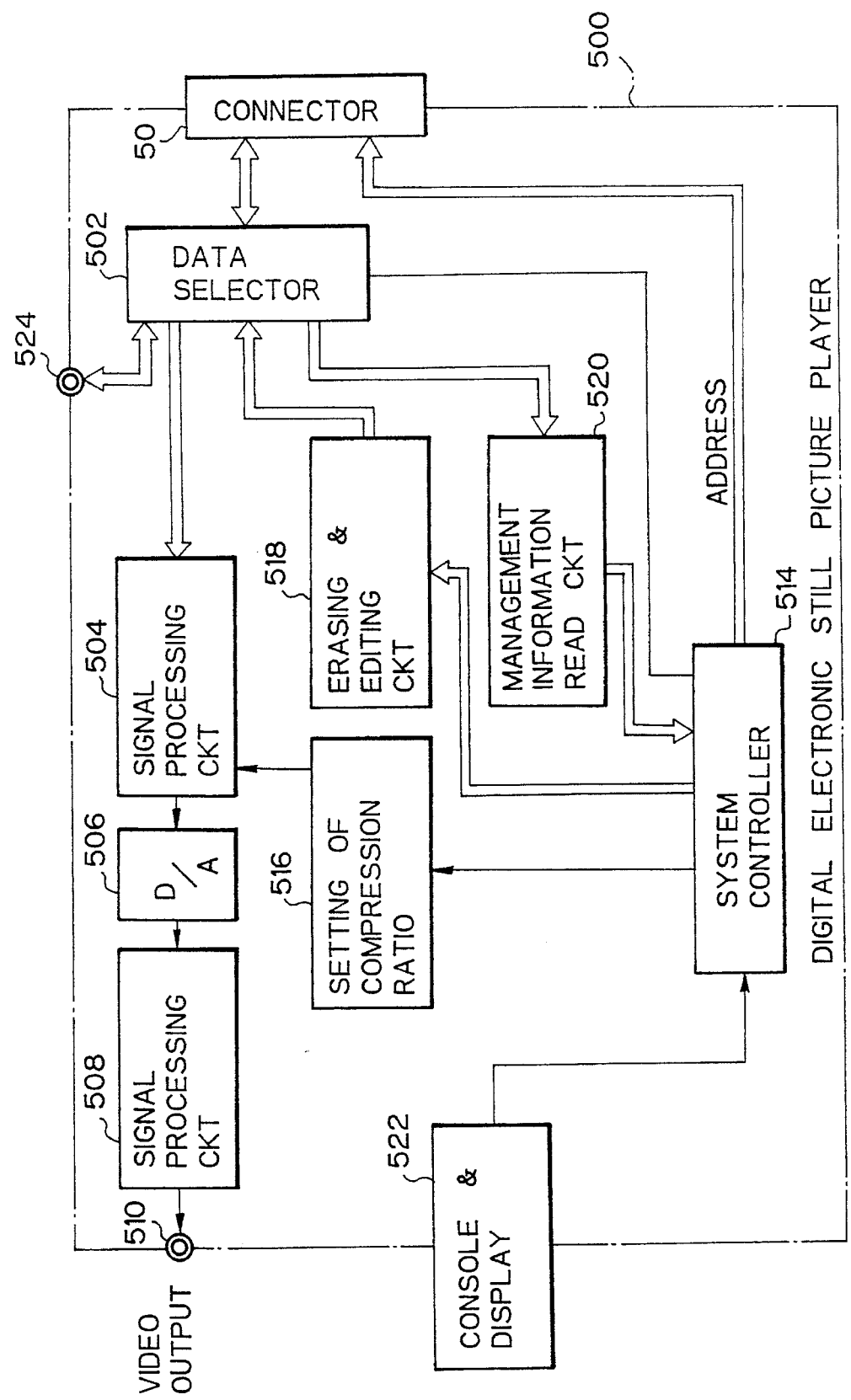
FIG. 10 is a functional block diagram schematically showing the structure of an electronic still picture player which is applied to the embodiment shown in FIG. 8.

FIG. 10 shows an electronic still picture player 500 in which tha data recorded in the memory card 801 with the camera 52 is reproduced on a display. The player 500 according to the present embodiment also serves as an editing device adapted for erasing abnormal data of the memory card 801 and re-editing the management area 300. In the player 500, the connector 50, which is to be connected to the memory card 801, is connected via a data selector 502 to a signal processing circuit 504. The signal processor 504 expands and decodes the picture data subjected to the data compression processing in accordance with the expansion scheme. The decoded picture data is converted into the the corresponding analog signal by a digital-to-analog (D/A) converter circuit 506. This analog signal is further converted by an additional signal processing circuit 508 into a standard television signal such as the RGB type of signal or the NTSC signal, which signal is passed via an output terminal 510 to a display unit such as a CRT.

A system control unit 514 controls the overall operation of the electronic still picture player 500 in accordance with a console and display 522. Connected to the system control unit 514 are an erasing and editing circuit 518 and a management information read circuit 520. The erasing and editing circuit rewrites the management area 300 in erasing and editing of the picture data stored in the memory card 801. The management information read circuit 520 reads the management data from the memory card 801 to the system control unit 514. The console and display 522 has a manually operable member for entering a designation of an image field or picture frame to be reproduced with the player and instructions on the reproduction and erasure of the data. The electronic player 500 is provided with a backup terminal 524 to which connected is a secondary storage medium such as a floppy disk, for backup which will be used in rewriting of data of the memory card 801. The backup terminal 524 is connected to the data selector 502. Data applied via connector 50, which is selected from the memory card 801, is supplied via the backup terminal 524 to the secondary storage medium.

A data recording method and an abnormality detection method performed by the memory management system of the present embodiment will be described in conjunction with the application of the above-mentioned image recording and reproduction systems.

First to describe the data recording method, after the memory card 801 is connected to the camera 52, the power switch is turned on. The turn on of the power switch causes the system control unit 68 to read out the management information in area 300 from the first EEPROM 830 of the memory card 801 into the management information read circuit 74. In this case, the system control unit 68 outputs the addresses of the clusters #0 and #1 of the management area 300, which addresses are sequentially passed via connector 50 to the address latch 8202, and in addition produces a read control signal RD which is in turn passed to the system controller 8212. Thus, in the card 801, the address latched in the address latch circuit 8202 is discriminated by the address identification circuit 8206, so that the memory controller 8208 is enabled, under the control of the system controller 8212 on the basis of the result from the discrimination, to make access to the addressed location of the management area 300 of the first EEPROM 830. As a result, the card attribute information in the area 310 to the MAT information in the area 360 of the management information in area 300 are sequentially read out and passed via the data buffer 8204 to the connector 50. Further in the camera 52 side, that information thus fed from the connector 50 is read out via the data selector 64 into the management information read circuit 74.

In the camera 52 end, upon receipt of the management information, it is checked whether or not the format number 322 of the header area 320 fits this camera 52. In this case, since the data recording is performed, it is necessary for the value of the format number 322 to coincide with the value prescribed to the camera 52, e.g. "DS10", over the whole bytes. If there is any incompatible byte, the console and display 66 provides an indication to inform an operator of an alarm for requiring him or her to replace the card 801. If both are completely coincident with each other, the console and display 66 provides an indication such that the card 801 is available, by turning on a green lamp, for example. Subsequently, the parity bits of the header area 320 are checked. As a result, if there is found no abnormality, it is confirmed that the data of the temporary information 324 are reliable. Next, the number of remaining clusters, the number of occupied clusters and the like are checked, so that the available quantity and the like is informed on the console and display 66. Thus, the operator may start, upon confirming the display, the photographing operation.

A picture signal representative of an image field captured is subjected to an image processing, such as color correction, in the first signal processing circuit 58 and converted into the corresponding digital signal through the A/D convertor circuit 60. This digital signal is processed with the data compression in the second signal processing circuit 62 on the basis of the values set up from the compression ratio setting circuit 70. Thus, a packet of picture data is made up to determine the amount of data. The amount of data of the packet is supplied to the system control unit 68. Upon receiving the amount of data, the system control unit 68 estimates the number of clusters for use in recording in the memory card 801 on the basis of the amount of data. Further, the system control unit 68 determines a destination cluster for writing the data on the basis of information such as the number of the eldest packet used and the number of the top or youngest cluster unused. In this case, the respective data in the management information area 300 are made up and sequentially written into the clusters #0 and #1 of the first EEPROM 830.

The data of the management information area 300, which are read out into the management information read circuit 74, are rewritten in the management information updating circuit 72, and the rewritten data are passed via the data selector 64 to the memory card 801. More specifically, according to the present embodiment, as shown in step S2 in FIG. 15, first, the system control unit 68 transmits to the management information updating circuit 72 error information which causes the recording termination flag to take the binary number "1" in the effective bit of the header area 320. The recording termination flag "1" is passed via data selector 64 and the connector 50 to the memory card 801, and then written into the effective bit of the header area 310 of the first EEPROM 830 through the data buffer 8204. Hence, in the case where there occurs an abnormality in the later writing, for example, in the case where the card 801 is ejected in the mid course of data recording or in a hot-line state since the recording termination flag is given a value of binary "1", it will be recognized that an abnormality occurs on some data in the management information area 300 or recording data in mid course of writing.

When writing of the recording termination flag is terminated, the process goes to step S3 in which writing of the substantial contents of the header area 320 is implemented. In this case, since the format number 322 of the header 320 has been recorded at the time of formatting, no rewriting is performed now. First, the temporary information 324 is rewritten. Regarding the temporary information 324, the management information updating circuit 72 rewrites or updates sequentially the number of the remaining clusters, the number of the occupied clusters, the number of the eldest packet used, the number of the top cluster not used, and parity bits. Those are sequentially supplied on a byte-by-byte basis via data selector 64 and the connector 50 to the memory card 801.

In the memory card 801, upon receipt of the number of the remaining clusters rewritten, a busy signal BUSY is sent out from the system controller 8212 via the connector 50 to the system control unit 68 of the camera 52, and in addition a control signal is sent out to the memory controller 8208 to erase the previous information of the associated address. In response to the control signal, the memory controller 8208 outputs a write signal WR1 providing such a control that the data recorded in the addressed area involved in the number of the remaining clusters of the first EEPROM 830 is erased and then the up-to-date number of the remaining clusters received from the data buffer 8204 is written into the address location thus subjected to the data erasure. Thus, the up-to-date number of the remaining clusters is written into the "remaining clusters" area of temporary information area 324. After completion of this writing, the memory controller 8208 reads out temporarily the number of the remaining clusters loaded, and collates this with the information of the buffer 8204. As the result from the verification, if it is determined that the writing has been normally accomplished, the memory controller 8208 sends to the system controller 8212 a signal indicative of the verification "OK". Upon receipt of the latter signal, the system controller 8212 withdraws the busy signal BUSY which was supplied to the camera 52.

At the camera 52 end, upon detecting the withdrawal of the busy signal BUSY, the system control unit 68 sends out to the memory card 801 the information on the number of the occupied clusters of the renewed temporary information 324. Thus, in the memory card 801, the buffer 8204 receives that information sent out from the camera 52. Subsequently, similarly to the above as discussed on the rewriting of the number of remaining clusters, the busy signal BUSY is sent out from the system controller 8212 to the system control unit 68 of the camera 52, and in addition a control signal is sent out to the memory controller 8208 to erase the previous information of the associated address. In the the memory controller 8208, there are performed erasure of the data in the area associated with the number of the occupied clusters of the first EEPROM 830, the writing and the verification. Thus, in the similar way to the above as discussed on the rewriting of the number of remaining clusters, rewriting of the number of occupied clusters is implemented. After completion of this rewriting, subsequently, the number of the eldest packet used, the number of the top cluster unused and the parity bits are rewritten sequentially in the named order. In this manner, rewriting of the temporary information 324 is implemented. If it is necessary to rewrite the card number 326 and the title 328 involved in the user's information, in the similar way to the above, these data are written into the dedicated domains of the header area 320 in the first EEPROM 830.

By the way, the parities of the format number 322 and the temporary information 324 indicate the effectivity of the area 320. During reading the header area 320, however, even when a coincidence or a compatibility is obtained, there happens occasionally such a case that the compatibility with the latest information is lost if a hot-line ejection was encountered. According to the present embodiment, assuming that an abnormality occurs in mid course of writing of the header area 320, for example, the card 801 is ejected on hot line, the abnormality detection bit D5 of the packet identification which is due to be written next is given by the binary "0" at this time. This is utilized to recognize the abnormality in writing of the header area 320 taking account of the fact that the recording termination flag takes the binary "1" which has been initially written. That abnormality can be removed by practicing the restoration treatment, which will be described later.

If the header area 320 is normally written, the process goes to step S4 in which, similarly to the above, updating of the packet identification in the area 330 is carried out in the management information updating circuit 72, and rewriting or updating for the memory card 801 is performed in a similar way to the above. In this case, the sixth bit D5 of the packet identification in the area 330 or abnormality detection bit is loaded with the binary number "1". Regarding the other portions, a suitable rewriting is performed to meet the contents so that the classification and attribute of the data such as picture data to be written are indicated. Next, the process goes to step S5 in which also similarly to the above, an updating of the directory information in the area 350 representative of the youngest cluster of the packet now to be rewritten into the memory card 801 and the like is carried out in the management information updating circuit 72, and rewriting for the memory card 801 is performed also in a similar way to the above.

Next, the process goes to step S6 in which the management information updating circuit 72 updates the MAT information in the area 360 representative of the continuity state between the clusters of the packet now to be recorded, and the memory card 801 is rewritten in a similar way to the above. In this case, according to the present embodiment, sequentially written into the MAT information area 360 of each cluster is an identification code such as a serial number at its upper five bits. This identification code permits the normality of the MAT information in the area 360 to be recognized in the reproduction treatment, which will also be described later.

In the case where the memory card 801 is ejected in mid course of recording the MAT information in the area 360 and the directory information in the area 350, since the abnormality detection bits of the recording termination flag and the packet identification in area 330 take the binary expression "1", respectively, it would be recognized through the following reproduction treatment that some of those data are involved in the abnormality. Specifically, in the case where the MAT information in the area 360 is involved in the abnormality, since that abnormality can be recognized by means of the identification code, and on the other hand, if the MAT information in the area 360 involves no abnormality, it is rendered possible to determine that the directory information in the area 350 is involved in the abnormality.

In this manner, after rewriting of the management area 300 is completed, the process goes to step S7 in which writing of the picture data subjected to the signal processing is carried out. In this case, the start address on each cluster is sent out from the system control unit 68 to the memory card 801. In the memory card 801, upon receipt of the addresses, the memory controller 8210 is operative to sequentially make access to the related address so that the data transmitted to the data buffer 8204 in the unit of eight bits are recorded in the addressed cluster of the second EEPROM 840. Also in this case, similarly to the management information in area 300, the erasure, writing and verification on each block are performed under the control of the memory controller 8210, and recording of the respective data is performed. When the normal recording of the data has been implemented, the process goes to step S8 in which there is provided, through the management information updating circuit 72, such a processing that the abnormality detection bit D5 of the packet identification is rewritten to take the binary number "0". Subsequently, the process goes to step S9 in which the recording termination flag is also rewritten to take the binary state "0". Thus, a series processing for data recording is terminated.

In the case of recording of a plurality of packets, the above-mentioned operation is repeatedly effected so as to rewrite the management area 300 as occasion calls. In this case, assuming that the memory card 801 is ejected on hot line, i.e. during active rewriting operation for the management area 300, the states of the detection flags are defined as shown in FIG. 16. First, in the hot-line ejection during recording of the header information in area 320, as shown in the case 1, the recording termination flag takes binary state "1", and the abnormality detection bit takes binary "0". In this case, specifically, when the memory card 801 is ejected in hot line during writing operation for some data of the temporary information in area 324, the parity bit appears discordant. In rewriting of data after formatting of data area 400, when the memory card 801 is ejected in hot line during the writing operation for the format number 322, the format number 322 is in its indefinite state.

Next, during the period after having recorded the header area 320 and before recording of the packet identification in area 330, as shown in a case 2, similarly to the case 1, the recording termination flag takes "1", and the abnormality detection bit takes "0", but the check by the parity bit is effective since after the temporary information in area 324 has been rewritten. In this case, however, the usage state of the respective cluster represented by the temporary information in area 324 is different from the actual usage state, since a hot-line ejection occurs here, so that recording of the successive information and data is not performed. It is thus needed to practice some treatment by the restoration processing, which will be described later.

Next, when the memory card 801 is ejected in hot line, after completing the recording of the packet identification in area 330, during the recording operation for the successive information, i.e. the packet association information in area 340, the directory in area 350, the MAT information in area 360 or the packet data, as shown in the cases 3 and 4, the recording termination flag takes "1", and also the abnormality detection bit takes "1". In the case 3, specifically, if the memory card 801 is ejected in hot line during the recording operation for the MAT information in area 360, and the identification codes written in the upper five bits are given for example, on a serial number basis, the identification codes would appear in discontinuity in the MAT information of any one of the clusters. Thus, this is detected as an abnormality. On the other hand, if no identification code is recorded, it is detected as an abnormality of the directory in area 350. The case 4 shows such a situation that the identification code is recorded, and the card 801 is ejected at the time of writing of data into the successive data area 400.

Figure 17A:
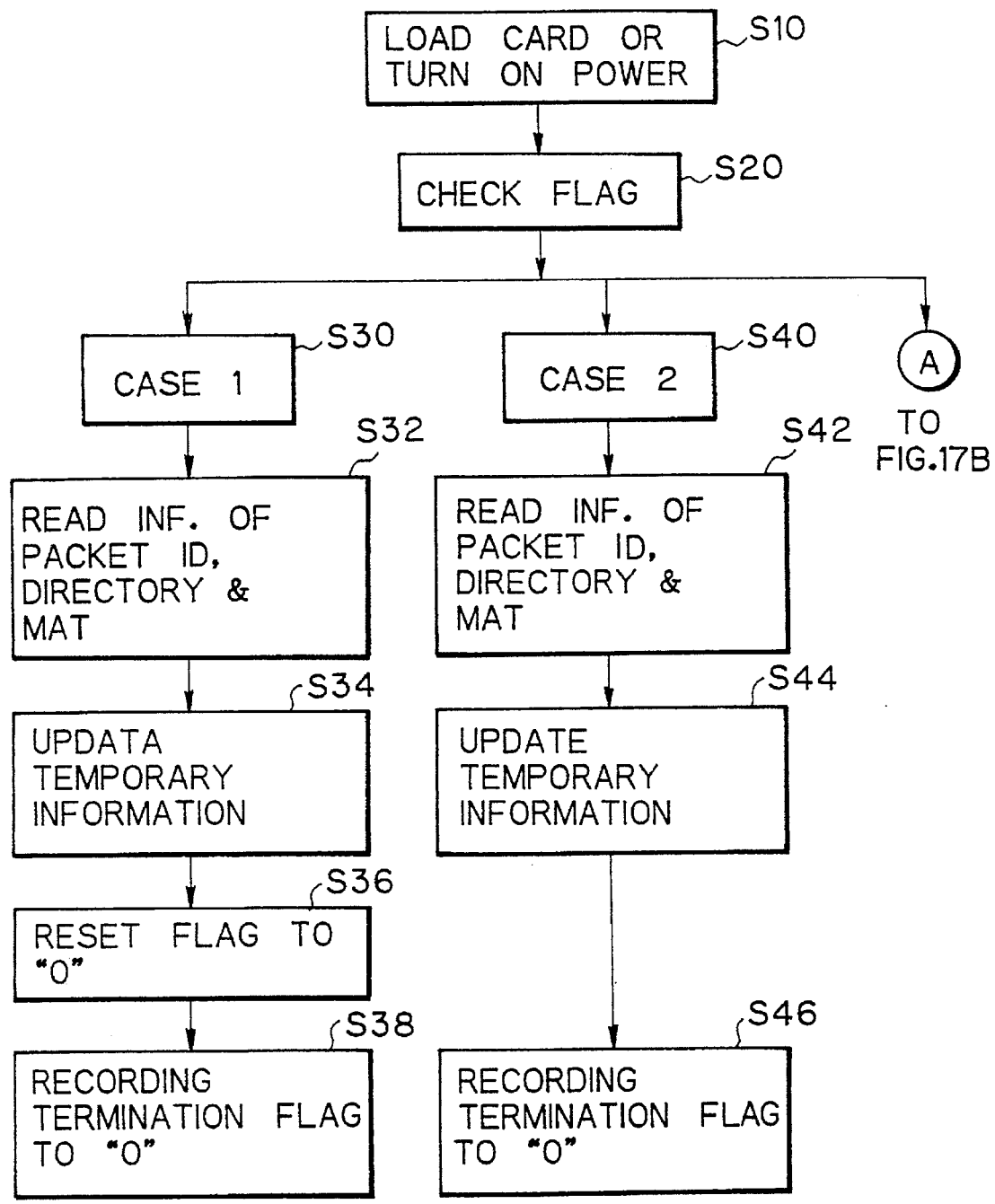
FIGS. 17A and 17B are flow charts illustrating an operational procedure for restoration process corresponding to the various cases shown in FIG. 16.
Figure 17B:
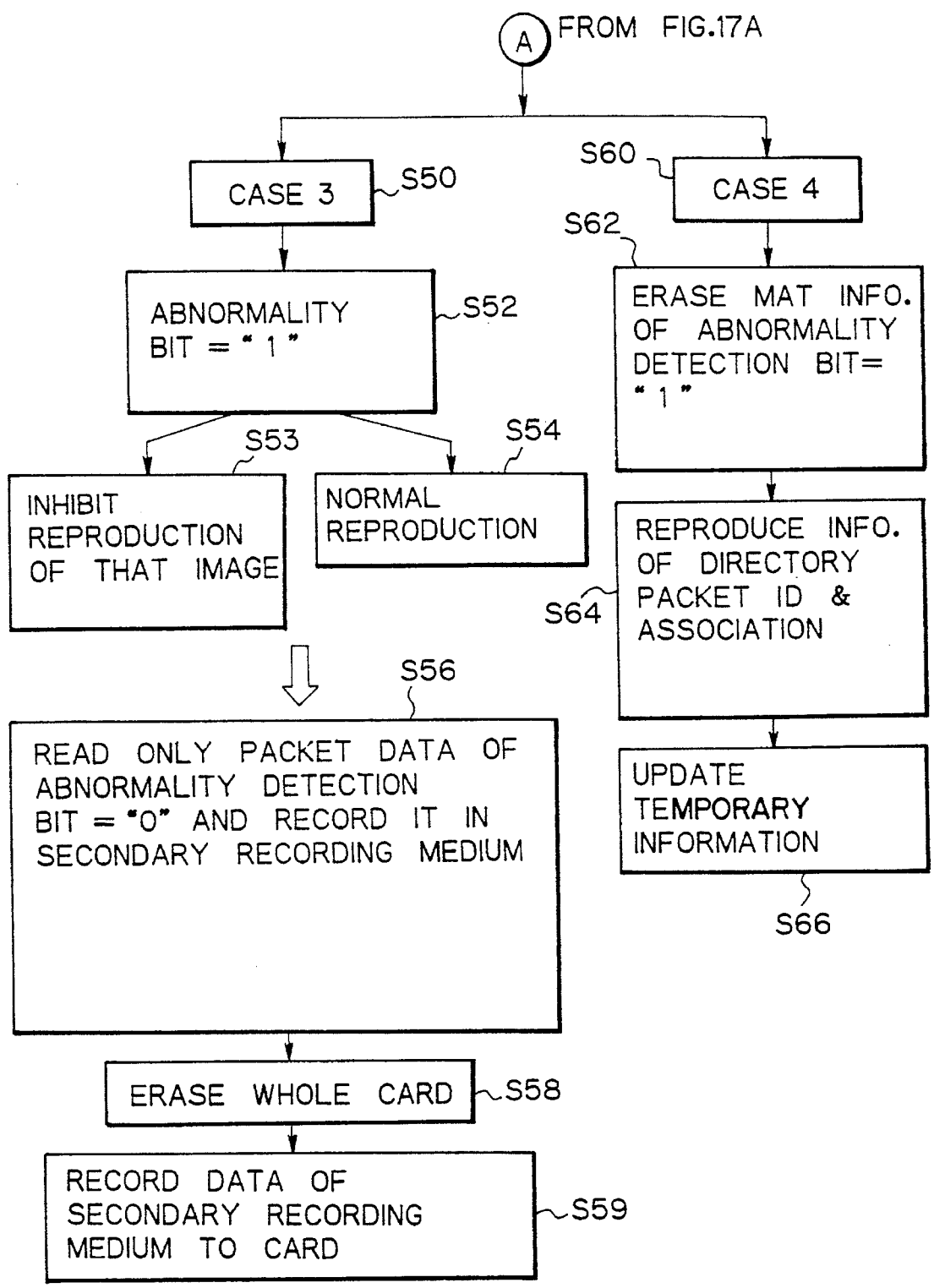

Next, referring to the FIGS. 17A and 17B, operations and processings will be described on the case wherein data recorded in the memory card 801 subjected to the abnormality such as the hot-line ejection as stated above is reproduced in the electronic still picture player 500 shown in FIG. 10. In step S10, when the memory card 801 is connected to the connector 50 of the player 500 and a power supply is turned on, the system controller 514 feeds over an address line to the memory card 801 an address for reading out the management information in the area 300, so that the management information in the area 300 is read out into a management information read circuit 520 of the player 500 in each individual cases shown in FIG. 17.

Subsequently, the process goes to step S20 in which the system controller 514 checks the recording termination flag and the abnormality detection bit to transfer to the respective cases. First, with the case 1 in step S30, since it involves an abnormality at the time of writing the header area 320, the temporary information in the area 324 indicative of the usage state of the memory has to be updated into a normal value. In this case, since the management information in area 300 other than the header area 320 is normal, the packet identification in area 330, the directory information in area 350 and MAT information in area 360, which involve no abnormality, are read (step S32). Those are utilized to implement a restoration of the temporary information in area 324 (step S34). More specifically, the number of clusters provided with the "occupied state" flag "1" of the eighth bit D7 of the packet identification is counted to alter the number of the used clusters. Next, the number of remaining clusters is estimated on the basis of the thus renewed number of the used clusters, and in addition, for example, information representative of the overall capacity of the memory, so as to update the number of the remaining clusters. The number of the eldest cluster used is updated in such a manner that numbers of the top clusters of the respective packets are compared with each other on the basis of the packet information of the directory information in the area 350 so as to extract the number of the packet having the maximum value of the top cluster numbers. The thus obtained number is designated as the number of the eldest cluster used.

Updating the number of the top cluster unused is performed in such a manner that the cluster continuity state of the packets in use is determined on the basis of the packet information of the directory information in the area 350 and the MAT information in area 360 so as to extract the number of the cluster unused between the youngest number of cluster and the second younger number of cluster. The thus obtained number is designated as the number of top cluster unused. Thus, after the temporary information in the area 324 indicative of the usage state of the memory has been updated into a normal value, the parity bits are calculated with reference to the respective bits. The thus altered header information in area 320 are sequentially supplied to the memory card 801 in a similar fashion to that of the data recording, and then written into the first EEPROM 830.

Subsequently, the process goes to step S36 in which, for example, the control flag is reset to "0" in the system controller 8212 of the memory card 801. In step S38, the writing termination flag is written with "0" into the management area 300. In this manner, the restoration treatment for the abnormality of the header area 320 in the event of case 1 is implemented. The thus restored card 801 may again be loaded to the camera 52 so that recording of data involving a failure in the previous recording is resumed.

In the event of case 2, the process goes to step S40. In this case, while the contents of the header area 320 have been normally written, there is a need to rewrite the temporary information of the header area 320, since a hot-line ejection has occurred before rewriting of the subsequent information. Thus, similarly to the case 1, in step S42, the packet identification in the area 330, the directory information in the area 350 and the MAT information in the area 360 are read. In step S44, those data are utilized to alter the temporary information in the area 324 and then written into the management area 300. When the temporary information in the area 324 has been normally written, the recording termination flag given with "1" indicative of an error state is set into "0" (step S46). In this manner, the restoration treatment for abnormality of the header area 320 in the case 2 is implemented. In this case also, the thus restored card 801 may again be loaded to the camera 52 so that recording of data involving a failure in the previous recording is resumed.

Next, with the case 3 in step S50, since it is involved in the abnormality when the MAT information is written in the area 360, the packet provided with the abnormality detection bit D5 "1" of the packet identification in the area 330 is deemed as a packet in which no data is written into the cluster of the data area, or a packet in which the previous data is erased and new data is due to be written thereinto. Consequently, in accordance with the reproducing processing in this case, as shown in steps S52 and S53, only the packets having the abnormality detection bit "0" in the packet identification in the area 330 may be rendered to usual reproduction, and the packets having the abnormality detection bit "1" are inhibited from being played back.

However, with the case 3, since the MAT information indicative of the continuity state of the packets is involved in the abnormality, it is difficult to identify which clusters constitute the associated packet. There is therefore a need to implement the restoration processing. In this case, first, the continuity of the normal MAT information, i.e. one provided with the abnormality detection bit "0" in the packet identification, is retrieved again so as to erase the remaining MAT information, namely the MAT information involved in the abnormality in writing and the corresponding packet data area. More specifically, in the case 3, in step S56, the system controller 514 of the player 500 detects the numbers of packets provided with the abnormality detection bit "0" in the packet identification in the area 330, and the data are read out on the basis of the associated MAT information from the data area 400 of the memory card 801, which data are temporarily stored into the secondary recording medium through the backup terminal 524 of the player 500.

Next, the system controller 514 sends out to the card 801 an erasure signal to erase the whole storage areas 300 and 400. Thus, the memory card 801 is initialized (step S58). Further, the system controller 514 provides such a control that an erasing and editing circuit 518 re-edits the management information in the area 300 after the data erasure, and then records the same onto the management information area 300. More specifically, in the step S58, first, the contents of the header area 320 is altered on the basis of the recording data backed up, which data are sequentially passed to the memory card 801 to be recorded into the header area of the first EEPROM 830. After completion of the writing of those data, the packet identification in area 330 is edited in a similar fashion to that as described above referring to the data recording for the camera 52, and then recorded into the first EEPROM 830 in a similar fashion to that as described referring to the writing for the header area 320. In a similar way, the packet association information in area 340, the directory information in the area 350 and the MAT information in the area 360 are sequentially written into the predetermined areas of the memory card 801, respectively. Particularly, regarding the MAT information in the area 360, since the packet before involved in the abnormality in the identification code has been erased, the MAT information of this packet is recorded in the form of unoccupied or unused state of packet. After having completed the management area 300, the process goes to step S59 in which data are sequentially read out from the secondary recording medium and then recorded in the clusters of the corresponding data area of the edited management area 300. In this case also, after completion of recording of the data, the abnormality detection bit is reset to "0", and in addition the recording termination flag is reset into "0", so that the restoration processing in the event of case 3 is completed. The memory card 801 subjected to the restoration processing is again mounted on the camera 52 to perform the data recording.

In the event of case 4, the process goes to step S60. In this case, while the recording of the MAT information in area 360 have been normally performed, an edition of the management area 300 is needed similar to the case 3, since a hot-line ejection has occurred before data writing. In step S62, the MAT information of the packet provided with the abnormality detection bit "1" of the packet identification in the area 330 is erased, so that the MAT information area 330 takes a normal state. Subsequently, the directory information in the area 350, the packet association information in area 340 and the packet identification in the area 330 of the related packet are updated. Those data are utilized to rewrite the temporary information in the area 324 of the header area 320 (steps S64 and S66). In this manner, the restoration treatment in the case 4 is implemented. On the other hand, if the packet of the MAT information involved in the abnormality includes non-erased data, such data are erased through steps S56–S59 in a similar fashion to that in case 3. In other words, it is acceptable that only the data involving no abnormality is saved on a backup basis, and the recording areas of the memory card 801 are erased once in its entirety, and then writing is carried out again on the data. Thereafter, the restored card 801 may again be installed to the camera 52 so that the recording processing is resumed.

As described above, according to the instant embodiment, in the data recording, there is provided such a series of processings that first, a recording termination flag indicative of the initiation of recording is written into the header area 320 in the form of the binary number "1", an abnormality detection bit for detecting an abnormality in writing is written in the form of the binary number "1", in mid course of writing into the management area 300, an identification code for confirming the normality of the MAT information in the last of the management information area 300 is included into the MAT information, and after writing of data into the data area 400, the abnormality detection bit is reset to "0". Also the recording termination flag is reset to "0". It is thus possible to readily detect which information in the management area 300 or data in the data area 400 are involved in the abnormality. Further, in the case where the abnormality is detected, since the portions involved in the abnormality are clearly indicated, it is possible to rewrite those portions referring to the regular information or data.

According the present embodiment, while it is so arranged that information recorded on the memory card 801 is restored by the player 500, it is acceptable also to be so arranged that for instance, a terminal for installing a secondary recording medium is provided at the camera 52 end, restoration treatment for the information are implemented when the card 801 after a hot-line ejection is mounted on the camera 52. According to such a modified arrangement, it is possible to immediately record on the card 801 data which ended in failure in the previous recording.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. An IC memory card control system comprising:

an IC memory card provided with a plurality of data areas in which data is stored and management areas in which management information is stored for managing recording of the data into the data areas; and IC memory card control means, to which said IC memory card is detachably coupled, for storing in said IC memory card management information and the data, the management areas of said IC memory card being provided with an identification area into which written are an occupation code indicative of recording of the data in a data area and a recording code indicative of an abnormal recording of the data in a data area, said IC memory card control means providing such a control that when writing the data into a data area, prior to data writing, the occupation code and the recording code are written into the identification area in a first significant condition, and after having completed the data writing the recording code is cleared/reset from the first significant condition.

2. An IC memory card control system comprising:

an IC memory card provided with a plurality of data areas in which data is stored and management areas in which management information is stored for managing recording of the data into the data areas; and IC memory card control means, to which said IC memory card is detachably coupled, for storing in said IC memory card management information and the data, the management areas of said IC memory card being provided with an identification area into which written are an occupation code indicative of recording of the data in a data area and a recording code indicative of an abnormal recording of the data in a data area, said IC memory card control means providing, upon detection of data containing the occupation code in a first significant condition and the recording code in a first significant condition from the management areas, such a control that corresponding pieces of information stored in the management areas and the data areas are saved, said IC memory card is initialized, thereafter normally recorded data are extracted on the basis of the occupation code and the recording code, and the management information corresponding to the extracted data is stored in the management areas, while the extracted data is stored in the data areas.

3. An IC memory card control system comprising:

an IC memory card, which is provided with a plurality of data areas in which data is stored and management areas in which management information is stored for managing recording of the data into the data areas, said IC memory card being provided with an identification area into which written are an occupation code indicative of recording of the data in a data area and a recording code indicative of an abnormal recording of the data in a data area; and IC memory card control means, to which said IC memory card is detachably coupled, for storing the management information and the data in said IC memory card, said IC memory card control means comprising management information read means for reading out the management information stored in the management areas of said IC memory card, management information updating means for updating the management information read out by said management information read means, and data recording means for writing the data into said IC memory card, said management information updating means providing such a control that when writing the data into a data area, prior to the data writing, the occupation code and the recording code are written into the identification area in a first significant condition, and after having completed the data writing the recording code is cleared/reset from the first significant condition.

4. The IC memory card control system according to claim 3, said IC memory card control means further comprising:

detecting means for detecting the recording code in the first significant condition from the read management information;

data read means for reading out the data stored in the data areas and for saving the read data; and initialization means for initializing the data and management areas, said management information updating means reading the management information from the management areas read out by said management information read means and making up management information for recording in the management areas data containing the occupation code in the first significant condition and the recording code cleared/reset from the first significant condition so as to update the management information, said data recording means writing, on the basis of the updated management information, the saved data into the data areas of said IC memory card initialized by said initialization means.

5. A memory card management system for managing recording and reproduction of data for a memory card which is detachably coupled to a host apparatus, wherein said memory card is provided with a management area in which management information for managing data is recorded, said management area including at least a header area in which header information indicating an occupation state of a data area is stored, a data identification area in which format information indicating a format for reading or writing data is stored, and a data allocation information area in which data allocation information indicating a continuity state between the data is stored, said host apparatus being operative, upon recording of the data into said memory card, to provide such a control that a recording start flag indicative of a recording start is written into the header area, and thereafter substantial contents of the header information is written into the header area, said host apparatus being operative to write, after having written the header information into the header area, data identification information including an abnormality detection flag for abnormality detection into the data identification area, said host apparatus being operative to record, following the data identification information, data allocation information including a data allocation check code indicative of a normality of the information in the data allocation information area, and said host apparatus being operative to record data in the data area after normal writing has been effected in said management area and to clear/reset the abnormality detection flag after the recording of the data, the recording start flag being cleared/reset for successive data recording into said memory card.

6. The memory card management system according to claim 5, wherein said host apparatus is operative, when said memory card is coupled thereto, to detect which of the management information is involved in an abnormality on the basis of the recording start flag, the abnormality detection flag and the identification code.

7. The memory card management system according to claim 6, wherein when the recording start flag of the management information is detected and no abnormality detection flag is detected, said host apparatus determines that the header area is involved in an abnormality and restores information of the header area on the basis of the management information following the header area.

8. The memory card management system according to claim 6, wherein when the recording start flag of the management information and the abnormality detection flag are both detected, said host apparatus determines a normality of the identification code included in the data allocation information, and detects an abnormality of the data allocation information.

9. The memory card management system according to claim 8, wherein when the abnormality of the data allocation information is detected, said host apparatus provides such a control that only normal data are saved, abnormal data are erased, allocation information related to the erased data is rewritten, and the header information is rewritten based on the rewritten allocation information, so that said memory card is restored.

10. The memory card management system according to claim 5, wherein said data allocation check code is a serial code on each data.

11. The memory card management system according to claim 5, wherein said data allocation check code is a random number.

12. The memory card management system according to claim 5, wherein said data allocation check code is a result from a logical operation made on a logical state of the data allocation information.

13. A memory card provided with a management area into which management information for recorded data is written and being detachably coupled to host equipment, said memory card comprising:

a relatively small capacity first storage element providing the management area; and a relatively large capacity second storage element providing a data area in which data are recorded, said first storage element being provided with at least a header area in which header information indicating an occupation state of the data area is stored, a data identification area in which data identification information indicating a format for reading or writing data is stored, and a data allocation information area in which data allocation information indicating a continuity state between the data is stored, said header area including a first effective bit corresponding to a recording start flag indicative of a recording start, said data identification area including a second effective bit corresponding to an abnormality detection flag for detection of an abnormality during recording, the data allocation information area being provided with a code area consisting of a plurality of bits which form a data allocation check code for confirming a normality of the information.

14. A memory card management system to which a memory card capable of storing plural pieces of management information together with data is detachably coupled, in which recording of data in said memory card is managed, the memory card management system comprising:

management information read means for sequentially reading the pieces of management information when said memory card is coupled to the memory card management system;

flag detection means for detecting an abnormality flag included in the read management information; and management information updating means for detecting abnormal portions of the management information on the basis of the abnormality flag detected by said flag detection means to restore the detected abnormal portions of the management information.

15. The memory card management system according to claim 14, further comprising:

medium coupling means for detachably coupling a secondary recording medium to the memory card management means for backing up normal data when an abnormality of the management information is detected;

erasing means for erasing data stored in recording areas of said memory card after backing up of the normal data; and recording means for recording the backup data and the management information restored by said management information updating means in the erased recording areas of said memory card.

* * * * *